(12) United States Patent
Tojo et al.

(10) Patent No.: US 8,371,687 B2
(45) Date of Patent: Feb. 12, 2013

(54) INK COMPOSITION AND IMAGE FORMATION METHOD

(75) Inventors: Kaoru Tojo, Kanagawa (JP); Masao Ikoshi, Kanagawa (JP); Teppei Yamamoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 495 days.

(21) Appl. No.: 12/642,474

(22) Filed: Dec. 18, 2009

(65) Prior Publication Data

US 2010/0165020 A1    Jul. 1, 2010

(30) Foreign Application Priority Data

Dec. 26, 2008 (JP) ................................ 2008-335114

(51) Int. Cl.
*G01D 11/00* (2006.01)
(52) U.S. Cl. ........... 347/100; 347/95; 523/160; 523/161
(58) Field of Classification Search .................... 347/95, 347/100.96, 101, 88, 99, 102; 106/31.6, 106/31.13, 31.27; 523/160, 161
See application file for complete search history.

(56) References Cited

U.S. PATENT DOCUMENTS

| | | | |
|---|---|---|---|
| 5,700,317 A | 12/1997 | Adamic | |
| 5,897,695 A * | 4/1999 | Mayo et al. | 106/31.75 |
| 6,008,270 A | 12/1999 | Santilli | |
| 2001/0045175 A1 | 11/2001 | Ouchi et al. | |
| 2010/0091055 A1 * | 4/2010 | Kawakami et al. | 347/9 |

FOREIGN PATENT DOCUMENTS

| | | |
|---|---|---|
| JP | 58-141256 A | 8/1983 |
| JP | 61-159472 A | 7/1986 |
| JP | 1-249870 A | 10/1989 |
| JP | 5-1254 A | 1/1993 |
| JP | 8-41410 A | 2/1996 |
| JP | 8-143804 A | 6/1996 |
| JP | 8-259869 A | 10/1996 |
| JP | 9-176544 A | 7/1997 |
| JP | 10-36724 A | 2/1998 |
| JP | 2001-262025 A | 9/2001 |
| JP | 2001-287353 A | 10/2001 |
| JP | 2003-292865 A | 10/2003 |
| JP | 2007-63432 A | 3/2007 |

(Continued)

OTHER PUBLICATIONS

Office Action issued on Jun. 8, 2010 for Japanese Application No. 2008-335114.
Japanese Office Action, dated Aug. 31, 2010, for Japanese Application No. 2008-335114.

*Primary Examiner* — Manish S Shah
(74) *Attorney, Agent, or Firm* — Birch, Stewart, Kolasch & Birch, LLP

(57) ABSTRACT

The invention provides an ink composition containing at least: a water-soluble organic solvent; a pigment; water; and a nonionic polymer thickener. The content of the water-soluble organic solvent is from 5 weight % to 30 weight % relative to the total amount of the ink composition. The ratio of $V_{high}/V_{low}$, in which $V_{high}$ represents 25° C. viscosity (mPa·s) measured at a shear rate of $1.5 \times 10^5$ (s$^{-1}$) and $V_{low}$ represents 25° C. viscosity (mPa·s) measured at a shear rate of $3.0 \times 10^3$ (s$^{-1}$), is from 0.70 to 0.95. The invention further provides an image formation method including at least ejecting the ink composition onto an image recording medium using an image formation apparatus to form an image on the image recording medium.

9 Claims, 5 Drawing Sheets

FOREIGN PATENT DOCUMENTS

| | | |
|---|---|---|
| JP | 2008-231336 A | 10/2008 |
| JP | 2008-231337 A | 10/2008 |
| JP | 2008-231338 A | 10/2008 |
| JP | 2008-231339 A | 10/2008 |

* cited by examiner

INK COMPOSITION AND IMAGE FORMATION METHOD

CROSS-REFERENCE TO RELATED APPLICATION

This application claims priority under 35 USC 119 from Japanese Patent Application No. 2008-335114 filed on Dec. 26, 2008, the disclosure of which is incorporated by reference herein.

BACKGROUND OF THE INVENTION

1. Field of Invention

The invention relates to an ink composition and an image formation method.

2. Description of the Related Art

An inkjet recording method is a method for recording by ejecting ink droplets from each of many nozzles formed at an inkjet head, and this method has been widely utilized because of the low level of noise generated during a recording operation, because running costs are inexpensive and because a high-quality image may be recorded on various recording media.

Many products such as regular paper, coated paper, glossy paper, OHP sheets and back-print film are commercially available as recording media for recording using an inkjet recording method; however, use of low-cost regular paper is most common for business applications in normal office environments. In addition to properties that are generally required, suppression of curling (warping or curling of paper) or the like generated when a large amount of ink is added to paper and suppression of deterioration of image resolution caused by variations in the direction of flight of ejected ink droplets when forming an image, are important properties required in such environments.

In relation to this, several inks for inkjet recording, which contain specific dispersing agents and specific compounds, have been proposed as having jetting stability (for example, see Japanese Patent Application Laid-Open (JP-A) Nos. 2008-231336, 2008-231337, 2008-231338, and 2008-231339).

SUMMARY OF THE INVENTION

Jetting stability of the inks described in JP-A Nos. 2008-231336, 2008-231337, 2008-231338, and 2008-231339, however, may have been insufficient. The present invention provides an ink composition that may have jetting stability, and an image forming method that may enable to stably eject an ink and provide an image having excellent rubbing resistance.

Namely, one aspect of the invention is an ink composition comprising: a water-soluble organic solvent; a pigment; water; and a nonionic polymer compound as a thickener, the content of the water-soluble organic solvent being from 5 weight % to 30 weight % relative to the total amount of the ink composition, and the ratio of $V_{high}/V_{low}$, in which $V_{high}$ represents 25° C. viscosity (mPa·s) measured at a shear rate of $1.5\times10^5$ $(s^{-1})$ and $V_{low}$, represents 25° C. viscosity (mPa·s) measured at a shear rate of $3.0\times10^3$ $(s^{-1})$, being from 0.70 to 0.95.

Another aspect of the invention is an image formation method comprising ejecting the ink composition onto an image recording medium using an image formation apparatus to form an image on the image recording medium, the image formation apparatus comprising a plurality of droplet ejecting devices and an ink circulation unit, the ink circulation unit comprising a common flow path communicating with the plurality of droplet ejecting devices via supply paths, and a common circulation path communicating with the plurality of droplet ejecting devices via circulation paths, and the ink circulation unit supplying the ink composition to the plurality of droplet ejecting devices from the common flow path and circulating the ink composition through the common circulation path.

DETAILED DESCRIPTION OF THE INVENTION

Figure 1:
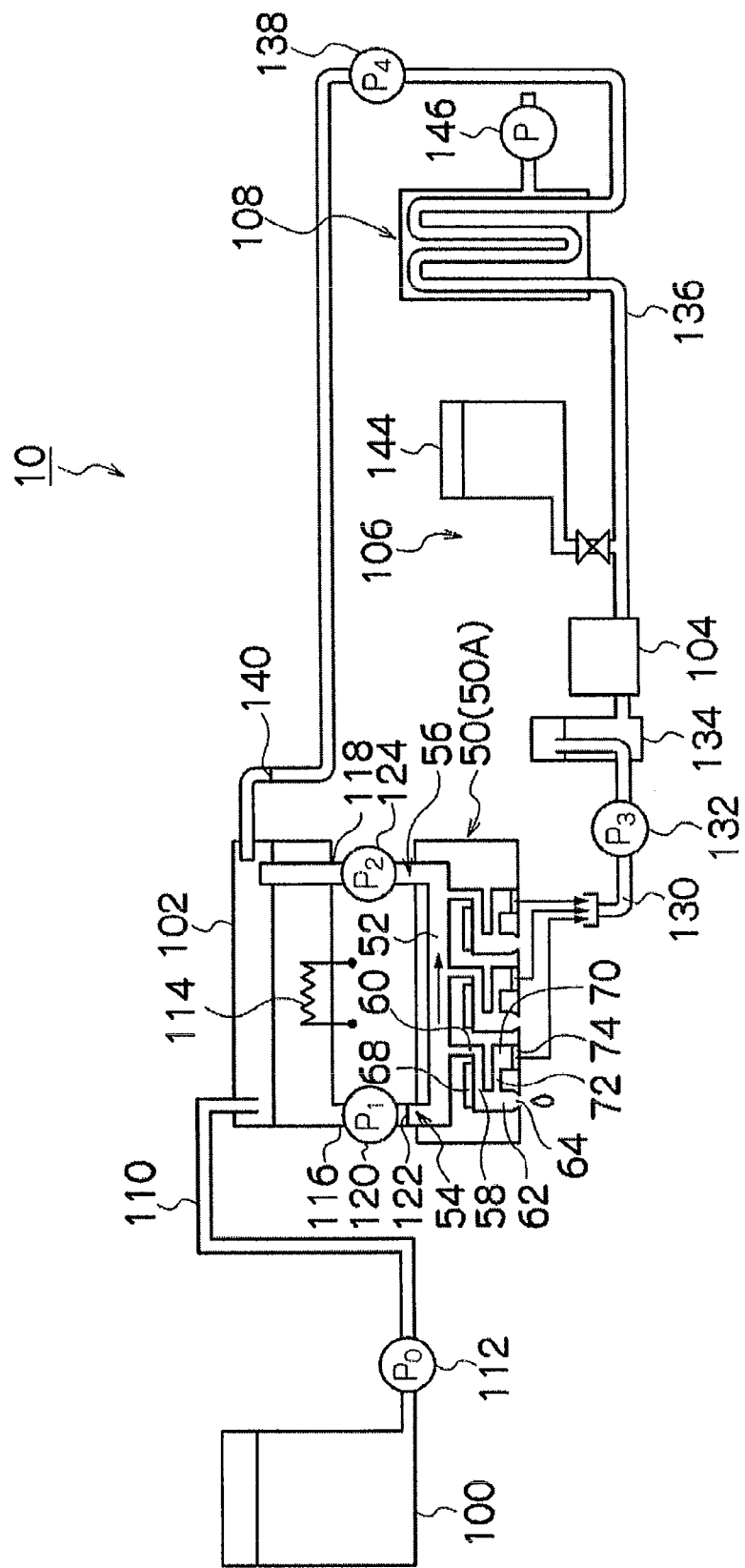
FIG. 1 is a schematic diagram showing an ink circulating system of the inkjet recording apparatus.

The invention provides an ink composition containing at least: a water-soluble organic solvent; a pigment; water; and a nonionic polymer thickener, the content of the water-soluble organic solvent being from 5 weight % to 30 weight % relative to the total amount of the ink composition, and the ratio of $V_{high}/V_{low}$, in which $V_{high}$ represents 25° C. viscosity (mPa·s) measured at a shear rate of $1.5\times10^5$ $(s^{-1})$ and $V_{low}$ represents 25° C. viscosity (mPa·s) measured at a shear rate of $3.0\times10^3$ $(s^{-1})$, being from 0.70 to 0.95.

This configuration of the ink composition of the invention may facilitate to achieve excellent jetting stability.

Shear Viscosity

The ink composition of the invention has a viscosity as measured while changing the shear rate (high-shear viscosity) that satisfies the following inequality expression.

$$0.70 \leq V_{high}/V_{low} \leq 0.95$$

In the inequality expression, $V_{high}$ represents 25° C. viscosity (mPa·s) measured at a shear rate of $1.5\times10^5$ $(s^{-1})$, and $V_{low}$ represents 25° C. viscosity (mPa·s) measured at a shear rate of $3.0\times10^3$ $(s^{-1})$.

Since ink is ejected from minute nozzles in inkjet recording, the ink is subjected to a high shear rate at the nozzles. If there is a significant reduction in viscosity when the shear rate is changed, ejection of ink from the nozzles becomes unstable.

In the invention, the change in viscosity when the shear rate is changed is reduced and it is possible to obtain stable ejection properties by adjusting the viscosity to within the above range.

In general, in ink compositions there is a tendency for the viscosity to decrease (for $V_{high}/V_{low}$ to be low) at a high shear rate due to an interaction between pigment particles and a nonionic polymer compound, and this can be the cause of ejection instability. The invention may achieve stable ejection properties as a result of the combination in the above configuration.

A nonionic polymer compound is added as a thickener in order to regulate the reduction in viscosity caused by the shear rate. Further, in order to regulate the reduction in viscosity caused by the shear rate, the molecular weight of the nonionic polymer compound used, the amount thereof added, the amount of the water-insoluble component (pigment, water-insoluble pigment dispersant and polymer particles) and/or the ratio between the respective amounts added of the water-insoluble component and the thickener, may be adjusted.

The method of measuring the viscosity at a changed shear rate is not particularly limited and known methods may be used. Examples of the method of measuring viscosity include a method using a MICRON-SAMPLE VISCOMETER VROC (trade name, manufactured by Rheosense Inc.).

In the invention, the values measured under the following conditions are designated as the values of the viscosity $V_{high}$ and $V_{low}$ at a changed shear rate.

A microchip-type MICRON-SAMPLE VISCOMETER VROC (described above) and a C-Type measurement chip (depth: 100 μm) are used. The measurement units of this viscometer are all stored in an incubator and the temperature is adjusted to 25° C.

Nonionic Polymer Compound

The ink composition of the invention includes at least one nonionic polymer compound as a thickener (also referred to as a polymer thickener in the following) in a phase in which a water-insoluble pigment is dispersed in an aqueous medium.

The nonionic polymer compound is preferably water-soluble. The nonionic polymer compound in the invention is not particularly limited as long as the viscosity of the aqueous solution in which the compound is dissolved is higher than that of water.

If ionic (cationic or anionic) polymer compounds are added as the polymer thickener, interaction between the dispersed materials may cause aggregation which, in turn, may cause deterioration in ink storage stability or significant deterioration in jetting stability.

The solubility (at 25° C.) of the nonionic polymer compound in the invention is preferably at least 1 g relative to 100 g of water.

The high-shear viscosity is preferably adjusted by adjusting the molecular weight of the nonionic polymer compound used as a thickener. The weight-average molecular weight of the nonionic polymer compound is preferably from 5000 to 100,000.

When the weight-average molecular weight of the nonionic polymer compound is 5000 or higher, it may be easy to obtain a sufficient thickening effect, and the compound is unlikely to cause deterioration in ejection properties or deterioration in rubbing resistance due to an increase in the amount there added. When the weight-average molecular weight of the nonionic polymer compound is no more than 100,000, a thickening effect can be obtained with a small amount thereof, reduction of viscosity at high shear can be suppressed, and ejection properties are unlikely to be impaired.

With a view to achieving both reliability of ejection from ink nozzles and rubbing resistance, the weight-average molecular weight of the nonionic polymer compound is more preferably from 8000 to 50,000.

Examples of the nonionic polymer compound include vinyl polymers, polyether polymers, polysaccharide polymers, polyacryl polymers, pyrrolidone polymers and cellulose polymers.

Specific examples of the nonionic polymer compound include gelatins, polyvinyl alcohols, various kinds of modified polyvinyl alcohols, polyvinyl pyrrolidones, vinyl formals and derivatives thereof, polyoxyalkylene glycols, polyacrylamide, polydimethylacrylamide, polydimethyl aminoacrylate, polyacrylate soda, acrylate/methacrylate copolymer salts, polymethacrylate soda, polymers including an acryl group of an acrylate/vinyl alcohol copolymer salt, natural polymers such as starch, oxidized starch, carboxyl starch, dialdehyde starch, dextrin, alginate soda, gum Arabic, casein, pullulan, dextran, cellulose and derivatives thereof (such as methyl cellulose, ethyl cellulose, carboxymethyl cellulose and hydroxypropyl cellulose) and derivatives thereof, and synthetic polymers such as polyethylene glycol, polypropylene glycol, polyvinyl ether, polyglycerin, maleic acid/alkyl vinyl ether copolymer, maleic acid/N-vinyl pyrrole copolymer and styrene/anhydrous maleic acid copolymer.

Herein, a "derivative" of a specific compound means a compound obtained by substituting, for an atom or an atomic group which is a partial structure of the specific compound, another atom or another atomic group.

Among these, in view of rubbing resistance and jetting stability, polyvinyl alcohol, polyvinyl pyrrolidone, polyoxyalkylene glycols, gelatins, vinyl formals and derivatives thereof, polymers including an acryl group of an acrylate/vinyl alcohol copolymer salt, and natural polymers such as starch, dextrin, gum Arabic, casein, pullulan, dextran, cellulose and derivatives thereof (such as methyl cellulose, ethyl cellulose, carboxymethyl cellulose and hydroxypropyl cellulose) and derivatives thereof, are preferable.

Polyvinyl alcohol, polyvinyl pyrrolidone and polyoxyalkylene glycols are more preferable.

The polyoxyalkylene glycols may include a single oxyalkylene group or two or more kinds of oxyalkylene group. When the polyoxyalkylene glycol includes two or more kinds of oxyalkylene group, it may be a random polymer or a block polymer.

In the invention, the polyoxyalkylene glycol is preferably at least one kind of polyoxyethylene glycol or polyoxyethylene-polyoxypropylene block copolymer, in view of jetting stability.

In view of jetting stability, the average degree of polymerization of the polyvinyl alcohol is preferably from 100 to 3500 and more preferably from 120 to 2000. Further, in view of the stability of the ink dispersion, the degree of saponification is preferably at least 50 mol % and more preferably at least 70 mol %.

The nonionic polymer compound preferably has a weight-average molecular weight of from 5000 to 100,000 and is preferably at least one selected from polyvinyl alcohol, polyvinyl pyrrolidone, polyoxyethylene glycol or polyoxyethylene-polyoxypropylene block copolymer; more preferably, the nonionic polymer compound has a weight-average molecular weight of from 8000 to 50,000 and is at least one selected from polyvinyl alcohol, polyvinyl pyrrolidone, polyoxyethylene glycol or polyoxyethylene-polyoxypropylene block copolymer.

In the invention, one kind of nonionic polymer compound may be used singly or two or more kinds thereof may be used in combination.

The amount of the nonionic polymer compound included in the ink composition may be selected appropriately in accordance with the kind of nonionic polymer compound. For example, the amount may be from 0.01 weight % to 20 weight %. Within this range, from 0.01 weight % to 5 weight % is preferable, and from 0.1 weight % to 3.0 weight % is more preferable, in view of jetting stability.

Water-Soluble Organic Solvent

The ink composition of the invention includes at least one or more water-soluble organic solvent(s). The one or more water-soluble organic solvent(s) is not particularly limited but the content of the one or more water-soluble organic solvent(s) is from 5 weight % to 30 weight % relative to the total amount of the ink composition.

The rubbing resistance of images formed using the ink composition of the invention may be improved by setting the content of the one or more water-soluble organic solvent(s) to within this range.

When the content of the one or more water-soluble organic solvent(s) is less than 5 weight %, the ink composition cannot be ejected. When the content exceeds 30 weight %, the rubbing resistance may deteriorate.

In view of the rubbing resistance, the content of the one or more water-soluble organic solvent(s) is preferably from 8 weight % to 25 weight % relative to the total amount of the ink composition, and more preferably from 10 weight % to 20 weight %.

The one or more water-soluble organic solvent(s) preferably contains a water-soluble organic solvent having a solubility parameter value of 27.5 or less at a content of 70 weight % or more with respect to the total content of the one or more water-soluble organic solvent(s).

Here, the "water-soluble organic solvent" in the invention means an organic solvent which can dissolve by 5 g or more in 100 g of water.

"SP value" as described in the invention means the solubility parameter (SP value) of a solvent, which is a value expressed by the square root of the cohesive energy of molecules. SP values are described in the Polymer Handbook (Second Edition), Chapter IV: "Solubility Parameter Values", and the values described therein are regarded as SP values in the invention. The unit for the SP value is $(MPa)^{1/2}$, and the SP values given represent values at a temperature of 25° C.

When the SP value data of a solvent of interest is not described in the above reference book, the value calculated by the method described in R. F. Fedors, Polymer Engineering Science, 14, pp. 147 (1967) (which is incorporated herein by reference in its entirety) is used as the SP value in the invention.

In view of the rubbing resistance, the content of the water-soluble organic solvent having a solubility parameter value of 27.5 or less is preferably 70 weight % or more, more preferably 80 weight % or more, and still preferably 70 weight % or more, with respect to the total content of the one or more water-soluble organic solvent(s). When the content of the water-soluble organic solvent having a solubility parameter value of 27.5 or less is less than 70 weight %, the rubbing resistance of images formed from the ink composition may be deteriorated.

The SP value of the water-soluble organic solvent having a solubility parameter value of 27.5 or less (, that is herein also referred to as a "first water-soluble organic solvent") is preferably from 16 to 27.5, and more preferably from 18 t 26.5.

Specific examples of the first water-soluble organic solvent employed in the invention include, but are not limited to, those described below.

Diethyleneglycol monoethyl ether (DEGmEE) (SP value: 22.4)

Diethyleneglycol monobutyl ether (DEGmBE) (SP value: 21.5)

Triethyleneglycol monobutyl ether (TEGmBE) (SP value: 21.1)

Propyleneglycol monoethyl ether (PGmEE) (SP value: 22.3)

Dipropyleneglycol (DPG) (SP value: 27.1)

Dipropyleneglycol monomethyl ether (DPGmME) (SP value: 21.3)

Triethyleneglycol monoethyl ether (TEGmEE) (SP value: 21.7)

Tripropyleneglycol monomethyl ether (TPGmME) (SP value: 20.4)

Triethyleneglycol monomethyl ether (TEGmME) (SP value: 22.1)

Tripropylene glycol (SP value: 24.7; for example, PP-200 (trade name, manufactured by Sanyo Chemical Industries, Ltd.))

Heptaoxypropylene glycol (SP value: 21.2; for example, PP-400 (trade name, manufactured by Sanyo Chemical Industries, Ltd.))

1,2 Hexandiol (SP value: 24.1)

POP (3) Glyceril ether (SP value: 26.4; for example, GP-250 (trade name, manufactured by Sanyo Chemical Industries, Ltd.))

POP (4) Glyceril ether (SP value: 24.9)

POP (5) Glyceril ether (SP value: 23.9)

POP (6) Glyceril ether (SP value: 23.2; for example, GP-400 (trade name, manufactured by Sanyo Chemical Industries, Ltd.))

POP (7) Glyceril ether (SP value: 22.6)

POP (8) Glyceril ether (SP value: 22.1)

POP (9) Glyceril ether (SP value: 21.7; for example, GP-600 (trade name, manufactured by Sanyo Chemical Industries, Ltd.))

POP (10) Glyceril ether (SP value: 21.4)

POP (16) Glyceril ether (SP value: 20.2; for example, GP-1000 (trade name, manufactured by Sanyo Chemical Industries, Ltd.))

POP (4) Diglyceril ether (SP value: 26.1; for example, SC-P400 (trade name, manufactured by Sakamoto Yakuhin Kogyo Co., Ltd.))

POP (9) Diglyceril ether (SP value: 22.7; for example, SC-P750 (trade name, manufactured by Sakamoto Yakuhin Kogyo Co., Ltd.))

POE (20) Diglyceril ether (SP value: 22.4; for example, SC-E1000 (trade name, manufactured by Sakamoto Yakuhin Kogyo Co., Ltd.)), POE (40) Diglyceril ether (SP value: 21.0; for example, SC-E2000 (trade name, manufactured by Sakamoto Yakuhin Kogyo Co., Ltd.).

Dioxyethylene dioxypropylene butyl ether (SP value: 20.1; for example, 50HB-55 (trade name, manufactured by Sanyo Chemical Industries, Ltd.)

Penta-oxyethylene penta-oxypropylene butyl ether (SP value: 19.7; for example, 50HB-100 (manufactured by Sanyo Chemical Industries, Ltd.)

Deca-oxyethylene hepta-oxypropylene butyl ether (SP value: 19.0; for example, 50HB-260 (trade name, manufactured by Sanyo Chemical Industries, Ltd.)

Dodeca-oxyethylene dodeca-oxypropylene butyl ether (SP value: 18.8; for example, 50HB-400 (trade name, manufactured by Sanyo Chemical Industries, Ltd.)

Deca-oxyethylene triaconta-oxypropylene butyl ether (SP value: 18.7; for example, PE-62 (trade name, manufactured by Sanyo Chemical Industries, Ltd.)

Pentacosa-oxyethylene triaconta-oxypropylene butyl ether (SP value: 18.8; for example, PE-64 (trade name, manufactured by Sanyo Chemical Industries, Ltd.)

Herein, "POP (n) glyceril ether" indicates an ether compound of glycerine, in which the number of propylene oxides added to glycerine is represented by "n" in the parentheses.

In preferable embodiments, the water-soluble organic solvent having an SP value of 27.5 or less may be a compound represented by the following structural formula.

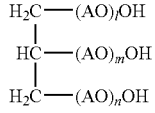

In the structural formula, 1, m and n each independently represent an integer of 1 or more, and the sum of 1, m and n (namely, 1+m+n) is in the range of from 3 to 15.

When 1+m+n is 3 or more, sufficient curling suppression property may be obtained. When 1+m+n is 15 or less, excellent jetting stability may be obtained.

1+m+n is preferably in the range of from 3 to 12, and is more preferably in the range of from 3 to 10.

In the structural formula each structure represented by AO is independently an ethyleneoxy group or a propyleneoxy group, and is preferably a propyleneoxy group.

The AOs in $(AO)_1$, $(AO)_m$, and $(AO)_n$ may be the same as or different from each other.

The water-soluble organic solvent having an SP value of 27.5 or less may be may be used singly, or in combination of two or more kinds thereof.

In addition to the water-soluble organic solvent having an SP value of 27.5 or less, the ink composition of the invention may further contain a water-soluble organic solvent having an SP value of greater than 27.5 at a content of less than 30 weight % with respect to a total amount of water-soluble organic solvents contained in the ink composition. The inclusion of the water-soluble organic solvent having an SP value greater than 27.5 (hereinafter sometimes referred to as a "second water-soluble organic solvent") may more effectively enable to achieve each of an anti-drying effect, a wetting effect, and a penetration enhancement effect.

The anti-drying effect or the wetting effect means, for example, an effect of preventing clogging of an ink ejection opening of a nozzle due to drying of the ink composition. The anti-drying agent and the wetting agent are preferably a water-soluble organic solvent having a lower vapor pressure than that of water.

The penetration enhancement effect means an effect of facilitating infiltration of the ink into paper, and a water-soluble organic solvent is preferably used as a penetration accelerator.

Examples of the second water-soluble organic solvent include polyhydric alcohols including glycerin, 1,2,6-hexanetriol, trimethylolpropane, and alkanediols such as ethyleneglycol, propyleneglycol, diethyleneglycol (DEG), triethyleneglycol, tetraethyleneglycol, pentaethyleneglycol, 2-butene-1,4-diol, 2-ethyl-1,3-hexanediol, 2-methyl-2,4-pentanediol, 1,2-octanediol, 1,2-pentanediol, or 4-methyl-1,2-pentanediol; alkyl alcohols having 1 to 4 carbon atoms such as ethanol, methanol, butanol, propanol or isopropanol; glycol ethers such as ethyleneglycol monomethyl ether, ethyleneglycol monoethyl ether, ethyleneglycol monobutyl ether, ethyleneglycol monomethyl ether acetate, ethyleneglycol mono-iso-propyl ether, ethyleneglycol mono-n-butyl ether, ethyleneglycol mono-t-butyl ether, or 1-methyl-1-methoxybutanol; 2-pyrrolidone, N-methyl 2-pyrrolidone, 1,3-dimethyl-2-imidazolidinone, formamide, acetamide, dimethylsulfoxide, sorbit, sorbitan, acetin, diacetin, triacetin, and sulfolane. These solvents may be used singly, or in combination of two or more thereof.

When the second water-soluble organic solvent is used for the purpose of an anti-drying agent or a wetting agent, the second water-soluble organic solvent is preferably a polyhydric alcohol, and examples thereof include glycerin, ethyleneglycol, diethyleneglycol, triethyleneglycol, propyleneglycol, dipropyleneglycol, 1,3-butanediol, 2,3-butanediol, 1,4-butanediol, 3-methyl-1,3-butanediol, 1,5-pentanediol, tetraethyleneglycol, 1,6-hexanediol, 2-methyl-2,4-pentanediol, polyethyleneglycol, 1,2,4-butanetriol, and 1,2,6-hexanetriol. These polyhydric alcohols may be used singly, or in combination of two or more thereof.

When the second water-soluble organic solvent is used for the purpose of a penetrating agent, the second water-soluble organic solvent is preferably a polyol compound. Examples of the polyol compound include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, 2-ethyl-1,3-hexanediol or 2,2,4-trimethyl-1,3-pentanediol. Among these compounds, 2-ethyl-1,3-hexanediol and 2,2,4-trimethyl-1,3-pentanediol are preferable.

The second water-soluble organic solvent used in the invention may be used singly, or two or more kinds thereof may be mixed and used.

Pigment

The ink composition of the invention contains at least one pigment. Preferable examples include a water-dispersible pigment.

Specific examples of the water-dispersible pigments include following (1) to (4).

(1) An encapsulated pigment, that is, a polymer emulsion formed by incorporating a pigment into polymer particles. More specifically, in the polymer emulsion, pigment particles are dispersed in water, and a resin layer formed of a hydrophilic water-insoluble resin covers the surfaces of the pigment particles and imparts hydrophilicity to the pigment particles.

(2) A self-dispersing pigment, that is, a pigment having at least one hydrophilic group on a surface thereof and exhibiting at least one of water-dispersibility and water-solubility in the absence of a dispersant. More specifically, the pigment is prepared by subjecting pigment particles (such as carbon black particles) to an oxidizing treatment so as to impart hydrophilicity to the surfaces of the pigment particles and so as to enable the pigment itself to disperse in water.

(3) A resin dispersed pigment, that is, a pigment dispersed using a water-soluble polymer compound having a weight average molecular weight of 50,000 or less.

(4) A surfactant-dispersed pigment, that is, a pigment dispersed using a surfactant.

Among these pigments, the (1) encapsulated pigment and the (2) self-dispersing pigment are preferable, and the (1) encapsulated pigment is particularly preferable.

In the following, the encapsulated pigment will be described in detail.

The resin used in the encapsulated pigment is not specifically limited, but is preferably a polymer compound that is self-dispersing or dissolvable in a mixed solvent of water and a water-soluble organic solvent and that has an anionic (acidic) group. In general, the number average molecular weight of the resin is preferably in the range of about 1000 to about 100,000, and particularly preferably in the range of about 3000 to about 50,000. The resin is preferably a resin that can dissolve in an organic solvent to form a solution. When the number average molecular weight of the resin is within the above ranges, the resin can exhibit sufficient function as a cover layer on pigment particles or as a coated layer on an ink component in an ink composition. The resin is preferably used in the form of an alkali metal salt or an organic amine salt.

The resin used for the encapsulated pigment may be, for example, a material having an anionic group, and examples thereof include thermoplastic, thermosetting, or modified resins of the following types of resin: an acrylic resin, an epoxy resin, a polyurethane resin, a polyether resin, a polyamide resin, an unsaturated polyester resin, a phenol resin, a silicone resin, a fluoropolymer compound; a polyvinyl resin such as polyvinyl chloride, polyvinyl acetate, polyvinyl alcohol or polyvinyl butyral; a polyester resin such as an alkyd resin or a phthalic acid resin; an amino resin such as a melamine resin, a melamine-formaldehyde resin, an aminoalkyd co-condensed resin, a urea formaldehyde resin, or a urea resin; and copolymers or mixtures of two or more of these resins.

Of the above resins, an anionic acrylic resin can be obtained, for example, by polymerizing, in a solvent, an acrylic monomer having an anionic group (hereinafter, referred to as an anionic group-containing acrylic monomer) and, optionally, one or more other monomers copolymerizable with the anionic group-containing acrylic monomer. Examples of the anionic group-containing acrylic monomer include an acrylic monomer having one or more anionic groups selected from the group consisting of a carboxylic group, a sulfonic acid group and a phosphonic acid group. Among these monomers, an acrylic monomer having a carboxyl group is preferable.

Examples of the acrylic monomer having a carboxyl group include acrylic acid, methacrylic acid, crotonic acid, ethacrylic acid, propylacrylic acid, isopropylacrylic acid, itaconic acid and fumaric acid. Among these monomers, acrylic acid and methacrylic acid are preferable.

An encapsulated pigment can be manufactured by a conventional physical and/or chemical method by using the above components. According to a preferable embodiment of the invention, the encapsulated pigment can be manufactured by the methods described in JP-A Nos. 9-151342, 10-140065, 11-209672, 11-172180, 10-25440, or 11-43636.

In the invention, the pigment is preferably the encapsulated pigment, which is a pigment obtained by dispersing a colorant by a phase-inversion method.

The phase-inversion method is a self-dispersing method (a phase-inversion emulsification method), which may include, for example, dispersing a mixture of a pigment and a water-soluble or self-dispersing resin in water; this "mixture" refers to a state in which the components in an undissolved state are mixed, or a state in which the components are dissolved and mixed, or a state including both of the above states. A more specific production method using the phase-inversion method may be similar to that described in JP-A No. 10-140065.

The self-dispersing pigment is also included in preferable examples of the colorant which can be employed in the invention. The self-dispersing pigment is a pigment in which a number of hydrophilic functional groups and/or a salt thereof (hereinafter, referred to as a dispersibility-imparting group) are directly or indirectly (via an alkyl group, an alkyl ether group, an aryl group or the like) bonded to the surfaces of particles of the pigment, so that the pigment particles can be dispersed in an aqueous medium without a dispersant. Here, the expression "dispersed in an aqueous medium without a dispersant", indicates a state in which the pigment particles are dispersible in the aqueous medium even when a dispersant for dispersing the pigment is not used.

An ink containing the self-dispersing pigment as a colorant does not need to contain a dispersant, which is otherwise contained for dispersing a usual pigment. Therefore, the ink containing the self-dispersing pigment is free from decrease in defoaming properties due to a dispersant, and generation of foam can hardly occur in the ink containing the self-dispersing pigment; accordingly, an ink with excellent ink ejecting stability can be easily prepared.

Examples of dispersibility-imparting groups to be bonded to the surfaces of self-dispersing pigment particles include —COOH, —CO, —OH, —SO$_3$H, —PO$_3$H$_2$, and a quaternary ammonium, and salts thereof. The self-dispersing pigment can be manufactured by subjecting a pigment as a raw material to a physical or chemical treatment so as to bond (graft) a dispersibility-imparting group or an active species having a dispersibility-imparting group to the surfaces of the pigment particles.

Examples of the physical treatment include a vacuum plasma treatment. Examples of the chemical treatment include a wet oxidizing method in which surfaces of pigment particles are oxidized by an oxidizing agent in water and a method in which p-aminobenzoic acid is bonded to surfaces of pigment particles whereby a carboxyl group is linked to the pigment particles through the phenyl group of p-aminobenzoic acid.

In the invention, preferable examples of the self-dispersing pigment include a self-dispersing pigment whose surface has been subjected to an oxidation treatment with a hypohalous acid and/or hypohalite and a self-dispersing pigment whose surface has been subjected to an oxidation treatment with ozone. Commercially available products may also be used as the self-dispersing pigment. Examples thereof include, MICROJET CW-1 (trade name, manufactured by Orient Chemical Industry), and CAB-O-JET200 and CAB-O-JET300 (both trade names, manufactured by Cabot Corporation).

The pigment used in the invention is not specifically limited, and may be appropriately selected depending on the purposes. For example, the pigment may be either an organic pigment or an inorganic pigment, or both.

Examples of the organic pigment include azo pigments, polycyclic pigments, dye chelates, nitro pigments, nitroso pigments and aniline black. In particular, azo pigments and polycyclic pigments are preferable.

Examples of the azo pigments include an azo lake pigment, an insoluble azo pigment, a condensed azo pigment, and a chelate azo pigment.

Examples of the polycyclic pigments include a phthalocyanine pigment, a perylene pigment, a perynone pigment, an anthraquinone pigment, a quinacridone pigment, a dioxazine pigment, an indigo pigment, a thioindigo pigment, an isoindolinone pigment, and a quinophthalone pigment.

Examples of the dye chelates include basic dye chelate pigments and acid dye chelate pigments.

Examples of the inorganic pigments include titanium oxide, iron oxide, calcium carbonate, barium sulfate, aluminum hydroxide, barium yellow, cadmium red, chrome yellow, and carbon black. Among these pigments, carbon black is particularly preferable. The carbon black may be, for example, a carbon black manufactured by a known method such as a contact method, a furnace method or a thermal method.

Examples of black pigments include carbon blacks such as RAVEN 7000, RAVEN 5750, RAVEN 5250, RAVEN 5000 ULTRAII, RAVEN 3500, RAVEN 2000, RAVEN 1500, RAVEN 1250, RAVEN 1200, RAVEN 1190 ULTRAII, RAVEN 1170, RAVEN 1255, RAVEN 1080, RAVEN 1060 or RAVEN700 (trade names, manufactured by Columbian Chemicals Co.); REGAL 400R, REGAL 330R, REGAL 660R, MOGUL L, BLACK PEARLS L, MONARCH 700, MONARCH 800, MONARCH 880, MONARCH 900, MONARCH 1000, MONARCH 1100, MONARCH 1300 or MONARCH 1400 (trade names, manufactured by Cabot Corporation); COLOR BLACK FW1, COLOR BLACK FW2, COLOR BLACK FW2V, COLOR BLACK 18, COLOR BLACK FW200, COLOR BLACK S150, COLOR BLACK S160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A or SPECIAL BLACK 4 (trade names, manufactured by Degussa); No. 25, No. 33, No. 40, No. 45, No. 47, No. 52, No.

900, No. 2200B, No. 2300, MCF-88, MA600, MA7, MA8 or MA100 (trade names, manufactured by Mitsubishi Chemical Corporation). However, in the invention, the black pigments are not limited thereto.

Organic pigments usable in the invention include yellow ink pigments such as C. I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155 or 180.

Organic pigments usable in the invention further include magenta ink pigments such as C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48 (Ca), 48 (Mn), 48:2, 48:3, 48:4, 49, 49:1, 50, 51, 52, 52:2, 53:1, 53, 55, 57 (Ca), 57:1, 60, 60:1, 63:1, 63:2, 64, 64:1, 81, 83, 87, 88, 89, 90, 101 (iron oxide red), 104, 105, 106, 108 (cadmium red), 112, 114, 122 (quinacridone magenta), 123, 146, 149, 163, 166, 168, 170, 172, 177, 178, 179, 184, 185, 190, 193, 202, 209, 219, 269 or C.I. pigment violet 19. Among these pigments, C.I. pigment red 122 is particularly preferable.

Organic pigments usable in the invention further include cyan ink pigments such as C.I. Pigment Blue 1, 2, 3, 15, 15:1, 15:2, 15:3, 15:34, 16, 17:1, 22, 25, 56, 60, C.I. Bat Blue 4, 60 or 63. Among these pigments, C. I. Pigment Blue 15:3 is particularly preferable.

The pigment may be used singly or in combination of two or more thereof, each of which may be selected from the above classes of pigments and may belong to the same class as each other or different classes from each other.

Dispersant

In the invention, the dispersant used in an encapsulated pigment or a resin dispersed pigment may be selected from a nonionic compound, an anionic compound, a cationic compound, or an amphoteric compound.

The dispersant is, for example, a copolymer formed from monomers having an α, β-ethylenic unsaturated group. Examples of the monomers having an α, β-ethylenic unsaturated group include ethylene, propylene, butene, pentene, hexene, vinyl acetate, allyl acetate, acrylic acid, methacrylic acid, crotonic acid, a crotonic acid ester, itaconic acid, an itaconic acid monoester, maleic acid, a maleic acid monoester, a maleic acid diester, fumaric acid, a fumaric acid monoester, vinyl sulfonic acid, styrene sulfonic acid, sulfonated vinyl naphthalene, vinyl alcohol, acrylamide, methacryloxy ethyl phosphate, bismethacryloxyethyl phosphate, methacryloxyethylphenyl acid phosphate, ethyleneglycol dimethacrylate, diethyleneglycol dimethacrylate, styrene, styrene derivatives such as α-methyl styrene or vinyltoluene; vinyl cyclohexane, vinyl naphthalene, vinyl naphthalene derivatives, an alkyl acrylate which may have an aromatic substituent, phenyl acrylate, an alkyl methacrylate which may have an aromatic substituent, phenyl methacrylate, a cycloalkyl methacrylate, an alkyl crotonate, a dialkyl itaconate, a dialkyl maleate, vinyl alcohol, and modified compounds of any of the above compounds.

A homopolymer formed by polymerization of one kind of monomer having an α, β-ethylenic unsaturated group, which may be selected from the above monomers, or a copolymer formed by copolymerization of plural kinds of monomer having an α, β-ethylenic unsaturated group, each of which may be selected from the above monomers, may be used as a polymer dispersant.

Examples of the polymer dispersant include an alkyl acrylate-acrylic acid copolymer, an alkyl methacrylate-methacrylic acid copolymer, a styrene-alkyl acrylate-acrylic acid copolymer, a styrene-phenyl methacrylate-methacrylic acid copolymer, a styrene-cyclohexyl methacrylate-methacrylic acid copolymer, a styrene-styrene sulfonic acid copolymer, a styrene-maleic acid copolymer, a styrene-methacrylic acid copolymer, a styrene-acrylic acid copolymer, a vinyl naphthalene-maleic acid copolymer, a vinyl naphthalene-methacrylic acid copolymer, a vinyl naphthalene-acrylic acid copolymer, polystyrene, a polyester, and polyvinyl alcohol.

The dispersant used in the invention preferably has a weight-average molecular weight of from 2000 to 60,000. The ratio of the addition amount of the dispersant to the pigment is preferably from 10 weight % to 100 weight %, more preferably from 20 weight % to 70 weight % and still more preferably from 40 weight % to 50 weight %, relative to the total amount of the pigment.

The content of the colorant is preferably from 0.1 weight % to 15 weight %, and more preferably from 1 weight % to 10 weight % relative to the total amount of the ink composition of the invention, in consideration of image density and image storage stability.

Polymer Particle

The ink composition of the invention preferably contains at least one kind of polymer particles.

The inclusion of the polymer particles may improve rubbing resistance of an image formed from the ink composition with maintaining jetting stability and dispersion-state stability of the pigment of the ink composition.

Examples of the polymer particles employed in the invention include particles of a resin having an anionic group such as: a thermoplastic, thermosetting, or modified acrylic resin, an epoxy resin, a polyurethane resin, a polyether resin, a polyamide resin, an unsaturated polyester resin, a phenol resin, a silicone resin, or a fluoro resin; a polyvinyl resin such as vinyl chloride, vinyl acetate, polyvinyl alcohol, or polyvinyl butyral; a polyester resin such as an alkyd resin or a phthalic resin; an amino resin material such as a melamine resin, a melamine formaldehyde resin, an amino alkyd co-condensation resin, a urea resin, or a urea resin; or mixtures or copolymers thereof.

Among the above, the anionic acrylic resin can be obtained by polymerizing, in a solvent, acrylic monomers having an anionic group (anionic group-containing acrylic monomer) and, as required, another monomer that can be copolymerized with the anionic group-containing acrylic monomer. Examples of the anionic group-containing acrylic monomer include an acrylic monomer having at least one selected from the group consisting of a carboxyl group, a sulfonic acid group, and a phosphonic acid group. Among the above, the acrylic monomers having a carboxyl group (e.g., acrylic acid, methacrylic acid, crotonic acid, ethacrylic acid, propylacrylic acid, isopropylacrylic acid, itaconic acid, and fumaric acid) are preferable, and acrylic acid or methacrylic acid is particularly preferable.

In preferable embodiments, the polymer particles employed in the invention can be preferably self-dispersible polymer particles, and in more preferable embodiments, the polymer particles employed in the invention can be self-dispersible polymer particles having a carboxyl group, from the viewpoint of ejecting stability and stability of ink composition as liquid (particularly dispersion stability) when the pigment is used. The "self-dispersible polymer particles" refer to particles of a water-insoluble polymer that can be in a dispersion state in an aqueous medium in the absence of another surfactant by a functional group (particularly an acidic group or a salt thereof) contained in the polymer and that does not contain a free emulsifier.

The "dispersion state" can be either an emulsion state, in which the water-insoluble polymer is dispersed as a liquid in an aqueous medium, or a suspension state, in which the water-insoluble polymer is dispersed as a solid in an aqueous medium.

From the viewpoint of the aggregation rate and the fixing property when the water-insoluble polymer is employed to form the ink composition, the water-insoluble polymer used in the invention is preferably one that can be in the suspension state.

The self-dispersible polymer particles employed in the invention can be visually observed as being in the dispersion state at 25° C. for at least one week, even when the dispersion thereof is prepared by mixing and stirring, by using a stirrer having a stirring blade with number of rotations of 200 rpm for 30 minutes at 25° C., a mixture of a solution containing 30 g of the water-insoluble polymer dissolved in 70 g of organic solvent such as methyl ethyl ketone, a neutralizer which can neutralize all salt-forming groups of the water-insoluble polymer, and 200 g of water, and then removing the organic solvent from the mixture solution, although the neutralizer is either sodium hydroxide when the salt-forming group is anionic or is acetic acid when a salt-forming group is cationic.

The "water-insoluble polymer" refers to a polymer whose dissolved amount to 100 g of water at 25° C. is 10 g or lower when the polymer is dried at 105° C. for 2 hours and then dissolved in the water. The dissolved amount is preferably 5 g or lower, and more preferably 1 g or lower. The "dissolved amount" is an amount of (a part of) the water-insoluble polymer dissolved in a solvent (water) when the water-insoluble polymer is completely neutralized with sodium hydroxide or acetic acid, wherein the selection from the sodium hydroxide and the acetic acid accords to the type of the salt-forming group of the water-insoluble polymer.

The aqueous medium contains water and may further contain a hydrophilic organic solvent as required. In preferable embodiments, the aqueous medium contains water and a hydrophilic organic solvent, an amount of the hydrophilic organic solvent being in a range of 0.2 weight % or lower with respect to water, and in more preferable embodiments, the aqueous medium is substantially water.

There is no limitation on the main chain skeleton of the water-insoluble polymer. Examples include vinyl polymer and a condensed polymer (e.g., an epoxy resin, polyester, polyurethane, polyamide, cellulose, polyether, polyurea, polyimide, and polycarbonate). Among the above, vinyl polymer is particularly preferable.

Preferable examples of vinyl polymer and a monomer which configures vinyl polymer include substances disclosed in JP-A Nos. 2001-181549 and 2002-88294. Moreover, a vinyl monomer in which a dissociative group has been introduced into a terminal of a polymer by radical polymerization of a vinyl polymer using a chain transfer agent or a polymerization initiator having a dissociative group (or a substituent that can be induced to be a dissociative group) or an iniferter or by ion polymerization using a compound having a dissociative group (or a substituent that can be induced to be a dissociative group) in either an initiator or a stopper also can be used.

Preferable examples of a condensed polymer and a monomer which configures the condensed polymer include substances described in JP-A No. 2001-247787.

In preferable embodiments, the self-dispersible polymer particles employed in the invention contains a water-insoluble polymer containing a hydrophilic structural unit and a structural unit derived from an aromatic group-containing monomer from the viewpoint of self-dispersibility.

The "structural unit (of a polymer) derived from a (specific) monomer" herein means a unit that has a structure which can be typically incorporated into the polymer by employing the (specific) monomer as that to be polymerized for forming the polymer.

There is no limitation on the hydrophilic structural unit insofar as it is derived from a hydrophilic group-containing monomer, and may be derived from one hydrophilic group-containing monomer or may be derived from two or more hydrophilic group-containing monomers. The hydrophilic group is not limited and may be a dissociative group or a nonionic hydrophilic group.

The hydrophilic group is preferably a dissociative group, and more preferably an anionic dissociative group, from the viewpoint of promoting the self-dispersibility and improving stability of the emulsion state or dispersion state of the self-dispersible polymer particles. Examples of the dissociative group include a carboxyl group, a phosphonic acid group, and a sulfonic acid group. Among the above, the carboxyl group is preferable from the viewpoint of fixing property when the ink composition is formed therewith.

The hydrophilic group-containing monomer is preferably a dissociative group-containing monomer from the viewpoint of self-dispersibility and aggregation properties, and specifically, the hydrophilic group-containing monomer is preferably a dissociative group-containing monomer having a dissociative group and an ethylenically unsaturated bond.

Examples of the dissociative group-containing monomer include an unsaturated carboxylic acid monomer, an unsaturated sulfonic acid monomer, and an unsaturated phosphonic acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methylsuccinic acid. Specific examples of the unsaturated sulfonic acid monomer include styrene sulfonic acid, 2-acrylamido-2-methyl propane sulfonic acid, 3-sulfopropyl(meth)acrylate, and bis-(3-sulfopropyl)-itaconate. Specific examples of the unsaturated phosphate monomer include vinyl phosphonic acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, from the viewpoint of dispersion stability and ejecting stability, the unsaturated carboxylic acid monomer is preferable and acrylic acid and methacrylic acid are more preferable.

In preferable embodiments, the self-dispersible polymer particles employed in the invention contain a polymer having a carboxyl group from the viewpoint of improving self-dispersibility and an aggregation rate when the ink composition contacts a treatment liquid. In more preferable embodiments, the self-dispersible polymer particles employed in the invention contain a polymer having a carboxyl group and an acid value (mgKOH/g) of 25 to 100. In further preferable embodiments, the acid value is from 25 to 80, and in particularly preferable embodiments, the acid value is from 30 to 65, from the viewpoint of improving self-dispersibility and an aggregation rate when the ink composition contacts a treatment liquid.

Stability of the dispersion state of the self-dispersible polymer particles can be favorable when the acid value is 25 or more, and the aggregation properties can be improved when the acid value is 100 or lower.

There is no limitation on the aromatic group-containing monomer insofar as it is a compound containing an aromatic group and a polymerizable group. The aromatic group may be a group derived from an aromatic hydrocarbon or a group derived from an aromatic heterocyclic ring. In embodiments, the aromatic group is preferably an aromatic group derived from an aromatic hydrocarbon from the viewpoint of particle shape stability in an aqueous medium.

The polymerizable group may be a condensation polymerizable group or an addition polymerizable group. In embodiments, from the viewpoint of particle shape stability of the self-dispersible polymer particles in the aqueous medium, the polymerizable group preferably an addition polymerizable group, and more preferably a group containing an ethylenically unsaturated bond.

The "group derived from an aromatic hydrocarbon (/an aromatic heterocyclic ring)" herein means a group that has a structure which can be formed by removing at least one atom from an aromatic hydrocarbon (or an aromatic heterocyclic ring).

The aromatic group-containing monomer employed in the invention is preferably a monomer having an ethylenically unsaturated bond and an aromatic group derived from aromatic hydrocarbon. The aromatic group-containing monomers may be used singly or in combination of two or more.

Examples of the aromatic group-containing monomer include phenoxyethyl(meth)acrylate, benzyl(meth)acrylate, phenyl(meth)acrylate, and a styrene monomer. Examples which are preferable from the viewpoint of well-balancing hydrophilicity and hydrophobicity of the polymer chain of the self-dispersible polymer particles and ink fixing property include an aromatic group-containing (meth)acrylate monomer. Specifically, phenoxyethyl(meth)acrylate, benzyl(meth) acrylate, and phenyl(meth)acrylate are more preferable, and phenoxyethyl(meth)acrylate and benzyl(meth)acrylate are further preferable.

The "(meth)acrylate" refers to acrylate or methacrylate.

In preferable embodiments, the self-dispersible polymer particles employed in the invention contains a structural unit derived from the aromatic group-containing (meth)acrylate monomer, the content of which being from 10 weight % to 95 weight % relative to the total amount of the water-insoluble polymer which forms the self-dispersible polymer particles. When the content of the aromatic group-containing (meth) acrylate monomer is from 10 weight % to 95 weight %, self-emulsifying property or stability of the dispersion state improves to thereby suppress an increase in ink viscosity.

In embodiments, the content of the aromatic group-containing (meth)acrylate monomer is more preferably from 15 weight % to 90 weight %, more preferably from 15 weight % to 80 weight %, and particularly preferably from 25 weight % to 70 weight %, from the viewpoint of improvement in self-emulsifying property or stability of the dispersion state, stabilization of the particle shape in an aqueous medium due to hydrophobic interaction of aromatic rings, and reduction in the amount of water-soluble components via appropriate hydrophobilyzation of particles.

The self-dispersible polymer particles employed in the invention can be formed by using, for example, a structural unit derived from the aromatic group-containing monomer and a structural unit derived from the dissociative group-containing monomer. The self-dispersible polymer particles may further contain other structural units.

While there is no limitation on a monomer which forms the other structural unit insofar as it can be copolymerized with the aromatic group-containing monomer and the dissociative group-containing monomer, from the viewpoint of flexibility of the main chain skeleton of the water-insoluble polymer or ease of regulation of glass transition temperature (Tg), an alkyl group-containing monomer is preferable.

Examples of the alkyl group-containing monomer include alkyl(meth)acrylates, such as methyl(meth)acrylate, ethyl (meth)acrylate, isopropyl(meth)acrylate, n-propyl(meth) acrylate, n-butyl(meth)acrylate, isobutyl(meth)acrylate, t-butyl(meth)acrylate, hexyl(meth)acrylate, or ethylhexyl (meth)acrylate; ethylenically unsaturated monomers having a hydroxyl group, such as hydroxymethyl(meth)acrylate, 2-hydroxyethyl(meth)acrylate, 2-hydroxypropyl(meth)acrylate, 4-hydroxybutyl(meth)acrylate, hydroxypentyl(meth)acrylate, or hydroxyhexyl(meth)acrylate; dialkylamino alkyl (meth)acrylates, such as dimethylaminoethyl(meth)acrylate; N-hydroxyalkyl(meth)acrylamides, such as N-hydroxymethyl(meth)acrylamide, N-hydroxyethyl(meth)acrylamide, or N-hydroxybutyl(meth)acrylamide; and (meth)acrylamides, such as N-alkoxyalkyl(meth)acrylamides, such as N-methoxymethyl(meth)acrylamide, N-ethoxymethyl (meth)acrylamide, N-(n-, iso)butoxymethyl(meth)acrylamide, N-methoxyethyl(meth)acrylamide, N-ethoxyethyl (meth)acrylamide, or N-(n-, iso)butoxyethyl(meth) acrylamide.

The molecular weight range of the water-insoluble polymer which configures the self-dispersible polymer particles employed in the invention is, in terms of weight average molecular weight, preferably from 3,000 to 200,000, more preferably from 5,000 to 150,000, and still more preferably from 10,000 to 100,000. By adjusting the weight average molecular weight to 3,000 or more, the content of water-soluble components can be effectively reduced. By adjusting the weight average molecular weight to 200,000 or lower, stability of self-dispersibility can be increased.

The weight average molecular weight can be measured by gel permeation chromatography (GPC). HLC-8020GPC (trade name, manufactured by Tosoh Corporation) is used as GPC apparatus, three columns of TSKGEL, SUPER MULTIPORE HZ-H (trade name, manufactured by Tosoh Corporation, 4.6 mmID×15 cm), and THF (tetrahydrofuran) as an eluate. The measurement is performed using an IR detector under the conditions of a sample concentration of 0.35 weight %, a flow rate of 0.35 ml/min., an injection amount of a sample of 10 µl, and a measurement temperature of 40° C. Calibration curves are prepared by eight samples of REFERENCE SAMPLE TSK STANDARD, POLYSTYRENE (trade name, manufactured by Tosoh Corporation): "F-40", "F-20", "F-4", "F-1", "A-5000", "A-2500", "A-1000" and "n-propylbenzene".

From the viewpoint of regulation of hydrophilicity and hydrophobicity of a polymer, in preferable embodiments, the water-insoluble polymer which configures the self-dispersible polymer particles employed in the invention contains a structural unit derived from the aromatic group-containing (meth)acrylate monomer (preferably a structural unit derived from phenoxyethyl(meth)acrylate and/or a structural unit derived from benzyl(meth)acrylate), wherein the content (copolymerization ratio) of the aromatic group-containing (meth)acrylate monomer is from 15 weight % to 80 weight % relative to the total amount of self-dispersible polymer particles.

From the viewpoint of regulation of hydrophilicity and hydrophobicity of a polymer, in preferable embodiments, the water-insoluble polymer preferably contains a structural unit derived from the aromatic group-containing (meth)acrylate monomer, a structural unit derived from a carboxyl group-containing monomer, and a structural unit derived from an alkyl group-containing monomer (preferably a structural unit derived from alkyl ester of (meth)acrylic acid wherein the content (copolymerization ratio) of the aromatic group-containing (meth)acrylate monomer is from 15 weight % to 80 weight % relative to the total amount of self-dispersible polymer particles. In more preferable embodiments, the water-insoluble polymer contains a structural unit derived from phenoxyethyl(meth)acrylate and/or a structural unit derived from benzyl(meth)acrylate, a structural unit derived from a carboxyl group-containing monomer, and a structural unit derived from an alkyl group-containing monomer (preferably a structural unit derived from alkyl ester having 1 to 4 carbon atoms of (meth)acrylic acid), wherein the content (copolymerization ratio) of the phenoxyethyl(meth)acrylate and/or a structural unit derived from benzyl(meth)acrylate is from 15 weight % to 80 weight % relative to the total amount of self-dispersible polymer particles. In addition, the water-insoluble polymer preferably has the acid value of from 25 to 100 and the weight average molecular weight of 3,000 to 200,000, and more preferably has the acid value of from 25 to 95 and the weight average molecular weight of 5,000 to 150,000.

Hereinafter, exemplary compounds B-01 to B-19 are shown as specific examples of the water-insoluble polymer which configures the self-dispersible polymer particles, although the invention is not limited thereto. The ratio in the brackets represents the weight ratio of copolymerization components.

B-01: Phenoxyethyl acrylate/Methyl methacrylate/Acrylate copolymer (50/45/5)
B-02: Phenoxyethyl acrylate/Benzyl methacrylate/Isobutyl methacrylate/Methacrylate copolymer (30/35/29/6)
B-03: Phenoxyethyl methacrylate/Isobutyl methacrylate/Methacrylate copolymer (50/44/6)
B-04: Phenoxyethyl acrylate/Methyl methacrylate/Ethylacrylate/Acrylate Copolymer (30/55/10/5)
B-05: Benzyl methacrylate/Isobutyl methacrylate/Methacrylate copolymer (35/59/6)
B-06: Styrene/Phenoxyethyl acrylate/Methyl methacrylate/Acrylate copolymer (10/50/35/5)
B-07: Benzyl acrylate/Methyl methacrylate/Acrylate copolymer (55/40/5)
B-08: Phenoxyethyl methacrylate/Benzyl acrylate/Methacrylate copolymer (45/47/8)
B-09: Styrene/Phenoxyethyl acrylate/Butyl methacrylate/Acrylate copolymer (5/48/40/7)
B-10: Benzyl methacrylate/Isobutyl methacrylate/Cyclohexyl methacrylate/Methacrylate copolymer (35/30/30/5)
B-11: Phenoxyethyl acrylate/Methyl methacrylate/Butyl acrylate/Methacrylate copolymer (12/50/30/8)
B-12: Benzyl acrylate/Isobutyl methacrylate/Acrylate copolymer (93/2/5)
B-13: Styrene/Phenoxyethyl methacrylate/Butyl acrylate/Acrylate copolymer (50/5/20/25)
B-14: Styrene/Butyl acrylate/Acrylate copolymer (62/35/3)
B-15: Methyl methacrylate/Phenoxyethyl acrylate/Acrylate copolymer (45/51/4)
B-16: Methyl methacrylate/Phenoxyethyl acrylate/Acrylate copolymer (45/49/6)
B-17: Methylmethacrylate/Phenoxyethyl acrylate/Acrylate copolymer (45/48/7)
B-18: Methyl methacrylate/Phenoxyethyl acrylate/Acrylate copolymer (45/47/8)
B-19: Methylmethacrylate/Phenoxyethyl acrylate/Acrylate Copolymer (45/45/10)

There is no limitation on a method of producing the water-insoluble polymer which configures the self-dispersible polymer particles employed in the invention. Examples include: a method including performing emulsion polymerization in the presence of a polymerizable surfactant to covalently bind a surfactant and a water-insoluble polymer; and a method including copolymerizing a monomer mixture containing the hydrophilic group-containing monomer and the aromatic group-containing monomer by known polymerization methods such as a solution-polymerization method or a block-polymerization method. Among the polymerization methods, the solution-polymerization method is preferable, and the solution-polymerization method using an organic solvent is more preferable, from the viewpoint of an aggregation rate and droplet ejecting stability when the self-dispersible polymer particles are employed in the ink composition.

From the viewpoint of an aggregation rate, it is preferable that the self-dispersible polymer particles employed in the invention contain a polymer, the polymer being synthesized in an organic solvent and having a carboxyl group (preferably the acid value thereof being 20 to 100), and the self-dispersible polymer particles being prepared as a polymer dispersion in which the carboxyl group of the polymer is partially or thoroughly neutralized and water serves as a continuous phase. More specifically, the production of the self-dispersible polymer particles employed in the invention preferably has synthesizing a polymer in an organic solvent and dispersing the polymer to form an aqueous dispersion in which at least a part of the carboxyl group of the polymer is neutralized.

The dispersing preferably includes the following processes (1) and (2).

Process (1): Stirring a mixture containing a polymer (water-insoluble polymer), an organic solvent, a neutralizer, and an aqueous medium; and Process (2): Removing the organic solvent from the mixture.

The process (1) preferably includes obtaining a dispersion by dissolving the polymer (water-insoluble polymer) in an organic solvent first, gradually adding a neutralizer and an aqueous medium, and mixing and stirring the mixture. The addition of the neutralizer and the aqueous medium in a solution of the water-insoluble polymer in which the polymer has been dissolved into an organic solvent may enable to provide self-dispersible polymer particles having particle diameters which may enable to achieve higher storage stability without strong shearing force.

There is no limitation on a stirring method of the mixture, and generally-used mixing and stirring devices or, as required, dispersers such as an ultrasonic disperser or a high voltage homogenizer can be used.

Preferable examples of the organic solvent include an alcohol solvent, a ketone solvent, and an ether solvent.

Examples of the alcohol solvent include isopropyl alcohol, n-butanol, t-butanol, and ethanol. Examples of the ketone solvent include acetone, methyl ethyl ketone, diethyl ketone, and methyl isobutyl ketone. Examples of the ether solvent include dibutyl ether and dioxane. Among the solvents, the ketone solvent such as methyl ethyl ketone, and the alcohol solvent such as isopropyl alcohol are preferable. It is also preferable to use isopropyl alcohol and methyl ethyl ketone in combination in view of making the change in polarity at the time of phase inversion from an oil phase to a water phase being moderate. By using the solvents in combination, self-dispersible polymer particles that can be free from coagulation-precipitation or fusion of particles and can have high dispersion stability and fine particle diameters can be obtained.

The neutralizer is used for forming an emulsion state or a dispersion state in which the dissociative group is partially or thoroughly neutralized and the self-dispersible polymer is stabilized in water. Examples of the neutralizer which can be used when the self-dispersible polymer employed in the invention has an anionic dissociative group (e.g., a carboxyl group) as the dissociative group include basic compounds such as organic amine compounds, ammonia, or hydroxides of alkali metals. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethylethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and tri-isopropanolamine. Examples of the hydroxides of alkali metals include lithium hydroxide, sodium hydroxide, and potassium hydroxide. Among the above, from the viewpoint of stabilization of dispersion of the self-dispersible polymer particles employed in the invention in water, sodium hydroxide, potassium hydroxide, triethylamine, and triethanolamine are preferable.

The content of the basic compound is preferably from 5 mol % to 120 mol %, more preferably from 10 mol % to 110 mol %, and still more preferably from 15 mol % to 100 mol %, with respect to 100 mol % of the dissociative groups. Stabilization of the dispersion of the particles in water can be further demonstrated when the content of the basic compound is adjusted to 15 mol % or more. Reduction in a content of the water-soluble components can be obtained when the content of the basic compound is adjusted to 100 mol % or lower.

In the process (2), an aqueous dispersion of the self-dispersible polymer particles can be obtained by inverting a phase of the dispersion, which has been obtained in the process (1), to a water phase by common procedures such as vacuum distillation distilling off the organic solvent from. The thus-obtained aqueous dispersion is substantially free of the organic solvent. The amount of the organic solvent contained in the aqueous dispersion is preferably 0.2 weight % or lower, and more preferably 0.1 weight % or lower.

The average particle diameter of the polymer particles (particularly the self-dispersible polymer particles) is, in terms of a volume average particle diameter, preferably in the range of 10 nm to 400 nm, more preferably in the range of 10 nm to 200 nm, still more preferably in the range of 10 nm to 100 nm, and particularly preferably in the range of 10 nm to 50 nm. When the average particle diameter is 10 nm or more, suitability of the polymer particles to production process may be increased. When the average particle diameter is 400 nm or lower, the storage stability may be increased. The particle size distribution of the polymer particles is not particularly limited. The polymer particles may have either a broad particle size distribution or a monodisperse particle size distribution. Two or more water-insoluble particles may be used in combination as a mixture.

The average particle diameter and particle size distribution of the polymer particles can be determined by measuring the volume average particle diameter by dynamic light scattering using a nanotruck particle size distribution meter UPA-EX150 (trade name, manufactured by Nikkiso Co., Ltd.).

From the viewpoint of glossiness of an image formed from the ink composition or the like, the content of the polymer particles (particularly the self-dispersible polymer particles) in the ink composition is preferably from 1 weight % to 30 weight %, and more preferably 5 weight % to 15 weight %, relative to the total amount of the ink composition.

The polymer particles (particularly the self-dispersible polymer particles) can be used singly or in a form of a mixture of two or more thereof.

In view of rubbing resistance, the ink composition of the present invention is preferably prepared so that the total amount of the pigment and water-insoluble dispersant (pigment dispersant) and the polymer particles (these ingredients are also referred to collectively as the water-insoluble component in the following) is at least 7 weight % relative to the total mass of the ink composition.

In view of both rubbing resistance and fixability, the total amount of the water-insoluble component is preferably in the range of from 7 weight % to 20 weight % relative to the total mass of the ink composition, and more preferably in the range of 8 weight % to 15 weight %. Further, in view of rubbing resistance, the content of the polymer particles in the water-insoluble component is preferably from 30 weight % to 90 weight % relative to the total mass of the water-insoluble component, and more preferably 40 weight % to 75 weight %.

Further, with a view to suppressing a reduction in viscosity at high shear and improving ejection properties, the ratio of the content of the polymer thickener relative to the content of the water-insoluble component in the ink composition is preferably smaller than 0.3 and more preferably smaller than 0.15.

Surfactant

The ink composition of the invention may contain at least one surfactant. By adding the surfactant, the surface tension of the ink composition can be adjusted. Any of a nonionic surfactant, a cationic surfactant, an anionic surfactant or a betaine surfactant can be used. In order for the ink of the invention to be satisfactorily applied by an inkjet system, the addition amount of the surfactant is such an amount that the surface tension of the ink composition of the invention at 25° C. is adjusted preferably to a range of from 20 mN/m to 60 mN/m, more preferably from 20 mN/m to 45 mN/m, and still more preferably from 25 mN/m to 40 mN/m.

A compound having a structure in which a hydrophilic moiety and a hydrophobic moiety are included in the molecule thereof can be effectively used as the surfactant employed in the invention. Any of an anionic surfactant, a cationic surfactant, an amphoteric surfactant, or a nonionic surfactant can be used. Furthermore, the above-mentioned polymer substance (polymer dispersant) is also usable as a surfactant.

Examples of the anionic surfactant include sodium dodecylbenzene sulfonate, sodium lauryl sulfate, a sodium alkyl diphenyl ether disulfonate, a sodium alkylnaphthalene sulfonate, a sodium dialkyl sulfosuccinate, sodium stearate, potassium oleate, sodium dioctylsulfosuccinate, a sodium polyoxyethylene alkyl ether sulfate, a sodium polyoxyethylene alkylphenyl ether sulfate, sodium dialkylsulfosuccinate, sodium stearate, sodium oleate, and sodium t-octylphenoxyethoxy-polyethoxyethyl sulfate. The surfactant may be used singly, or in combination of two or more thereof.

Examples of the nonionic surfactant include polyoxyethylene lauryl ether, polyoxyethylene octyl phenyl ether, polyoxyethylene oleyl phenyl ether, polyoxyethylene nonyl phenyl ether, oxyethylene-oxypropylene block copolymer, t-octyl phenoxyethyl polyethoxyethanol, and nonylphenoxyethyl polyethoxyethanol. The nonionic surfactant may be used singly, or in combination of two or more thereof.

Examples of the cationic surfactant include a tetraalkyl ammonium salt, an alkylamine salt, a benzalkonium salt, an alkylpyridinium salt, and an imidazolium salt. Specific examples include dihydroxyethyl stearylamine, 2-heptadecenyl-hydroxyethyl imidazoline, lauryldimethyl benzyl ammonium chloride, cetyl pyridinium chloride, and stearamide methylpyridium chloride.

The addition amount of surfactant to be added to the ink composition of the invention is not specifically limited, but is preferably from 1 weight % or more, more preferably from 1 to 10 weight %, and even more preferably from 1 to 3 weight % relative to the total amount of the ink composition.

Other Components

The ink composition of the invention may contain other additives. Examples of other additives include known additives such as an ultraviolet absorber, an anti-fading agent, an antifungal agent, a pH adjuster, an antirust agent, an antioxidant, an emulsion stabilizer, an antiseptic agent, a defoaming agent, a viscosity adjustment agent, a dispersion stabilizer, and a chelating agent.

Examples of the ultraviolet absorber include a benzophenone ultraviolet absorber, a benzotriazole ultraviolet absorber, a salicylate ultraviolet absorber, a cyanoacrylate ultraviolet absorber, and a nickel complex salt ultraviolet absorber.

As the anti-fading agent, various organic anti-fading agents and metal complex anti-fading agents can be used. Examples of the organic anti-fading agent include hydroquinones, alkoxyphenols, dialkoxyphenols, phenols, anilines, amines, indans, chromanes, alkoxy anilines, and heterocycles. Examples of the metal complex anti-fading agents include a nickel complex and a zinc complex.

Examples of the antifungal agent include sodium dehydroacetate, sodium benzoate, sodium pyridinethione-1-oxide, ethyl p-hydroxybenzoate, 1,2-benzisothiazoline-3-one, sodium sorbate, and sodium pentachlorophenol. The content of antifungal agent in the ink composition is preferably from 0.02 to 1.00 weight %.

The pH adjuster is not specifically limited as long as the pH adjuster can adjust a pH value to a desired value without exerting an adverse influence on the ink composition to which the pH adjuster is added. The pH adjuster may be selected appropriately in accordance with the purpose. Examples of the pH adjuster include alcohol amines (such as diethanlol amine, triethanol amine or 2-amino-2-ethyl-1,3-propanediol); alkali metal hydroxides (such as lithium hydroxide, sodium hydroxide or potassium hydroxide); ammonium hydroxides (such as ammonium hydroxide or quaternary ammonium hydroxide); phosphonium hydroxide; and alkali metal carbonates.

Examples of the antirust agent include acid sulfite, sodium thiosulfate, ammonium thiodiglycolate, diisopropyl ammonium nitrite, pentaerythritol tetranitrate, and dicyclohexyl ammonium nitrite.

Examples of the antioxidant include phenolic antioxidants (including hindered phenol antioxidants), amine antioxidants, sulfur antioxidants, and phosphorus antioxidants.

Examples of the chelating agent include sodium ethylenediamine tetraacetate, sodium nitrilotriacetate, sodium hydroxyethyl ethylenediamine triacetate, sodium diethylenetriamine pentaacetate, and sodium uramil diacetate.

Physical Properties of Ink Composition

The surface tension of the ink composition of the invention at 25° C. is preferably to a range of from 20 mN/m to 60 mN/m, more preferably from 20 mN/m to 45 mN/m, and still more preferably from 25 mN/m to 40 mN/m. The surface tension may be adjusted to be in a desired range by, for example, adding a surfactant.

The viscosity of the ink composition at 20° C. is preferably in the range of from 5 mPa·s to 20 mPa·s, more preferably in the range of from 5.5 mPa·s to 18 mPa·s, and still more preferably in the range of 6 mPa·s to 16 mPa·s, from the viewpoint of jetting property. The viscosity of the ink composition at 40° C. is preferably in the range of from 3 mPa·s to 15 mPa·s, more preferably in the range of from 3.5 mPa·s to 12 mPa·s, and still more preferably in the range of 4 mPa·s to 10 mPa·s. The viscosity may be adjusted to be in a desired range by, for example, varying the molecular weight, the content or the like of the water-soluble organic solvent. The viscosity of the ink composition can be more easily adjusted to be in a desired range by the inclusion of the first water-soluble organic solvent.

The viscosity of the ink composition may be measured with, for example, a Brookfield viscometer.

Reaction Liquid

In the invention, a reaction liquid (also referred to hereinafter as "treatment liquid") capable of forming aggregates by contacting with the ink composition can be used together with the ink composition. The application of the reaction liquid onto an inkjet recording medium can be carried out either before or after application of the ink composition to the inkjet recording medium. Particularly, when the reaction liquid is previously applied onto an inkjet recording medium before application of the ink composition, ink aggregates can be formed rapidly upon contacting the reaction liquid with the ink composition.

The pH of the reaction liquid at 25° C. is preferably 1 to 6, more preferably 2 to 5, and still more preferably 3 to 5, from the viewpoint of the coagulation rate of the ink composition. The treatment liquid can be formed as the coagulation accelerator by using at least one acidic compound. Examples of the acidic compound include compounds having a phosphate group, a phosphonic acid group, a phosphinic acid group, a sulfuric acid group, a sulfonic acid group, a sulfinic acid group, or a carboxyl group, or salts thereof. Among the above, from the viewpoint of the coagulation rate of the aqueous ink composition, the compounds having a phosphonic acid group or a carboxyl group are more preferable, and the compounds having a carboxyl group are still more preferable.

The compounds having a carboxyl group are preferably selected from polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyronecarboxylic acid, pyrrolecarboxylic acid, furancarboxylic acid, pyridinecarboxylic acid, coumalic acid, thiophenecarboxylic acid, nicotinic acid, modified compounds thereof, and salts thereof (e.g., polyvalent metal salts). These compounds may be used singly or in combination of two or more thereof.

The treatment liquid may further contain an aqueous solvent (such as water) in addition to the acidic compound.

The content of the acidic compound in the treatment liquid is preferably from 5 weight % to 95 weight %, and more preferably from 10 weight % to 80 weight %, with respect to the total mass of the treatment liquid from the viewpoint of the coagulation effects.

One preferable example of the treatment liquid that improves high-speed coagulation properties include a treatment liquid to which a polyvalent metal salt or polyallylamine compound is added. Examples of the polyvalent metal salt include alkaline earth metals of the 2A group of the periodic table (e.g., magnesium and calcium), the transition metals of the 3B of the periodic table (e.g., lanthanum), cation of the 3A group of the periodic table (e.g., aluminum), and salts of lanthanides (e.g., neodymium). Examples of the polyallylamine compound include polyallylamine and modified compound of polyallylamine. Among the above, calcium and magnesium are preferable. Carboxylate (formic acid salt, acetic acid salt, benzoate, etc.), nitrate, chloride, and thiocyanate are preferable as a counter salt of calcium and magnesium. The content of the salts of metals in the treatment liquid is preferably in the range of about 1 weight % to about 10 weight %, more preferably in the range of about 1.5 weight % to about 7 weight %, and still more preferably in the range of about 2 weight % to about 6 weight %.

The treatment liquid employed in the invention may further contain other additives as long as the effect of the invention is not impaired. Examples of such other additives include known additives such as an ant-drying agent (a wetting agent), an anti-fading agent an emulsion stabilizer, penetration accelerating agent, an ultraviolet absorber, an antiseptic agent, an antifungal agent, a pH adjuster, a surface tension adjusting agent, a defoaming agent, a viscosity adjustment agent, a dispersant, a dispersion stabilizer, an antirust agent, or a chelating agent, and specific examples of these are similar to the specific examples employable in the ink composition.

The viscosity of the treatment liquid is preferably in the range of 1 mPa·s to 30 mPa·s, more preferably in the range of 1 mPa·s to 20 mPa·s, still more preferably in the range of 2 mPa·s to 15 mPa·s, and particularly preferably in the range of 2 mPa·s to 10 mPa·s from the viewpoint of the coagulation rate of the ink composition.

The surface tension of the treatment liquid is preferably 20 mN/m to 60 mN/m, more preferably 20 mN/m to 45 mN/m, and still more preferably 25 mN/m to 40 mN/m from the viewpoint of the coagulation rate of the ink composition.

Image Forming Method

The invention provides an image formation method including at least ejecting the ink composition onto an image recording medium using an image formation apparatus to form an image on the image recording medium, the image formation apparatus having at least a plurality of droplet ejecting devices and an ink circulation unit, the ink circulation unit having at least a common flow path communicating with the plurality of droplet ejecting devices via supply paths, and a common circulation path communicating with the plurality of droplet ejecting devices via circulation paths, and the ink circulation unit supplying the ink composition to the plurality of droplet ejecting devices from the common flow path and circulating the ink composition through the common circulation path.

This configuration of the image formation method of one aspect of the invention, that employs the ink composition and the specific image formation apparatus, may provide excellent jetting property (particularly, intermittent ink ejecting property) and excellent resolution of images formed thereby.

Image Formation Apparatus

The image formation apparatus used in the invention has at least a plurality of droplet ejecting devices and an ink circulation unit. The ink circulation unit has at least a common flow path communicating with the plurality of droplet ejecting devices via supply paths, and a common circulation path communicating with the plurality of droplet ejecting devices via circulation path. The ink circulation unit supplies the ink composition to the plurality of droplet ejecting devices from the common flow path and circulates the ink composition through the common circulation path.

The image formation apparatus used in the invention is not particularly limited as long it has this configuration, and may further have other known devices.

Since the image formation method of the invention has the above configuration, the ink composition always circulate in the ink circulation unit. Accordingly, increase of the viscosity of the ink composition in the vicinity of the nozzles may be inhibited even if nozzles are unused on standby, so that jet failure may be inhibited. Particularly, failure upon intermittent jet can be significantly inhibited by the use of the ink composition.

Configuration of Ink Circulating System

The ink circulating system in an inkjet recording apparatus as one exemplary embodiment of the image formation apparatus of the invention will be described.

FIG. 1 is a schematic diagram showing an ink circulating system of the inkjet recording apparatus.

As shown in FIG. 1, the ink circulating system in the inkjet recording apparatus 10 is composed mainly of a recording head 50 (50A), an ink tank 100, a sub-tank 102, a solvent concentration detector 104, a solvent addition unit 106, and a degasifier 108, in which an ink is supplied from the ink tank 100 to the recording head 50 via the sub-tank 102, and ink droplets are jetted from a plurality of nozzles 64 provided on the recording head 50. A part of the ink supplied to the recording head 50 is returned to the sub-tank 102 via the inside of the head.

Hereinafter, the configuration of each part in the ink circulating system will be described.

The flow path 110 connecting the ink tank 100 with the sub-tank 102 is provided with a pump 112. The ink in the ink tank 100 is supplied to the sub-tank 102 by the pump 112. The pump 112 is regulated such that the amount of the ink in the sub-tank 102 is kept constant. An ink temperature regulation heating-cooling unit 114 is provided in the sub-tank 102. The temperature of the ink in the sub-tank 102 is regulated and kept at a predetermined temperature by the ink temperature regulation heating-cooling unit 114 so that the viscosity of the ink decreases. In embodiments, a temperature sensor (not shown) that detects the temperature of the ink inside the recording head 50 is equipped to regulate the ink temperature regulation heating-cooling unit 114 such that the temperature of the ink inside the recording head 50 may be at a certain temperature (that is, the temperature to attain a desired viscosity of the ink) such as 55° C.

The sub-tank 102 and the recording head 50 are connected with each other via a first flow path 116 and second flow path 118. The first flow path 116 is connected to the recording head 50 via a first feed opening 54 formed at one end of the common flow path 52 formed in the recording head 50, and the second flow path 118 is connected to the recording head 50 via a second feed opening 56 formed at the other end of the common flow path 52. The first low path 116 is a feed flow path for feeding the ink from the sub-tank 102 to the recording head 50 and is provided with pump 120 and filter 122. The second flow path 118 is a circulation flow path for returning a part of the ink fed to the recording head 50 to the sub-tank 102 and is provided with pump 124.

The ink in the sub-tank 102 is supplied from the first flow path 116 to the recording head 50 via the filter 122 by the pump 120. The fineness (mesh size) of the filter 122 is preferably smaller than the size of the opening of the nozzle of the recording head in order to inhibiting clogging of the nozzle due to entering of foreign substances from the sub-tank 102 to the recording head 50. For example, a filter with a mesh size smaller by about 10% than the nozzle size may be used.

A part of the ink supplied to the recording head 50 is transferred through the common flow path 52 and returned from the second flow path 118 to the sub-tank 102 by the pump 124. In embodiments, the second flow path 118 may be provided with a vacuum degasifier (not shown) located upstream of the pump 124.

Each pressure chamber 58 communicating with the common flow path 52 is provided with a nozzle flow path 62 that is a path communicating with the nozzle 64. The nozzle flow path 62 is provided with a circulation path 72 and communicates with a common circulation path 70 via the flux path 72. The common circulation path 70 communicates with a recovery opening 74 via a connecting flow path (not shown in FIG. 1, and shown as a unit numbered as "71" in FIG. 3). A flow path 130 connecting with the pump 132 is connected to the recovery opening 74.

Figure 2:
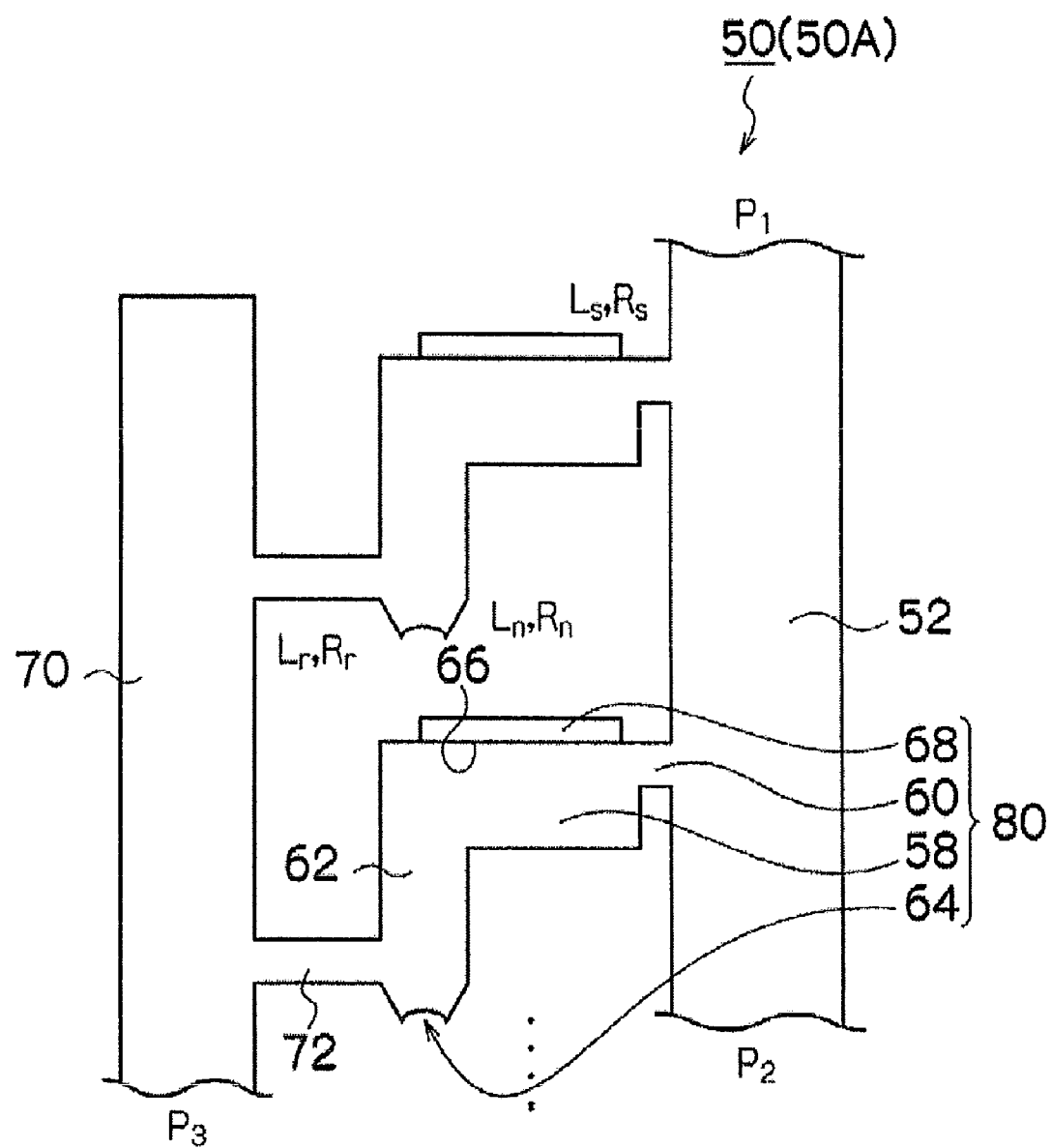
FIG. 2 is a schematic diagram showing one example of an internal structure of the recording head 50.

FIG. 2 is a schematic diagram showing one example of an internal structure of the recording head 50. As shown in FIG. 2, the recording head 50 is provided with a plurality of droplet ejecting devices 80 each having a nozzle 64 serving as an opening to jet ink droplets, a pressure chamber 58, a supply path 60, and a piezoelectric element 68 which deforms a vibrating plate 66 which forms the wall surface of the pressure chamber 58. The recording head 50 has a plurality of head units, which are provided in line, and each of which is provided with a large number of droplet ejecting devices 80 in a matrix (2-dimensional) form.

Each pressure chamber 58 communicates with the common flow path 52 via the supply path 60. The ink is supplied from the common path flow 52 to each pressure chamber 58 via the supply path 60. The supply path 60 also functions as a feeding regulator for inhibiting a back current of the ink from the pressure chamber 58 to the common flow path 52. The nozzle 64 communicates with each pressure chamber 58 via the nozzle flow path 62.

The piezoelectric element 68 is equipped on the vibrating plate 66 which forms the wall surface of each pressure chamber 58. When a driving voltage is applied to the piezoelectric element 68, the volume of the pressure chamber 58 varies according to the deformation of the vibrating plate 66. When the vibrating plate 66 is deformed such that the volume of the pressure chamber 58 is increased, the meniscus formed in the nozzle 64 is pulled toward the ink-inflow side (the side of the pressure chamber 58), while the ink in the common flow path 52 is sucked into the pressure chamber 58 via the supply path 60, thereby refilling the pressure chamber with the ink. On the other hand, when the vibrating plate 66 is deformed such that the volume of the pressure chamber 58 is decreased, the meniscus formed in the nozzle 64 is pushed toward the ink jet side (the side opposite to the pressure chamber 58) so that ink droplets are jetted from the nozzle 64. The interval between pulling and pushing is particularly preferably made one fourth (¼) relative to the fluidic resonance period between the pressure chamber 58 and the ink, since the vibration of pulling can overlap with the vibration of pushing to attain large displacement so that the ink can be easily jetted.

When the ink is jetted, the ink in the pressure chamber 58 flows not only to the nozzle flow path 62 at the ink jet side, but also partially flows to the supply path 60 at the ink feed portion. The amount of the ink flowing from the pressure chamber 58 to the nozzle flow path 62 and the amount of the ink flowing to the supply path 60 are determined by the ratio between the flow path resistance in the nozzle flow path 62 and that of the supply path 60, and by the ratio between the inertance of the ink in the nozzle flow path 62 and that of the supply path 60. Dimensions of each part of general inkjet heads are determined such that the ratio of the amount of the ink flowing to the nozzle flow path 62 to the amount of the ink flowing to the supply path 60 becomes approximately 1/1.

Figure 3:
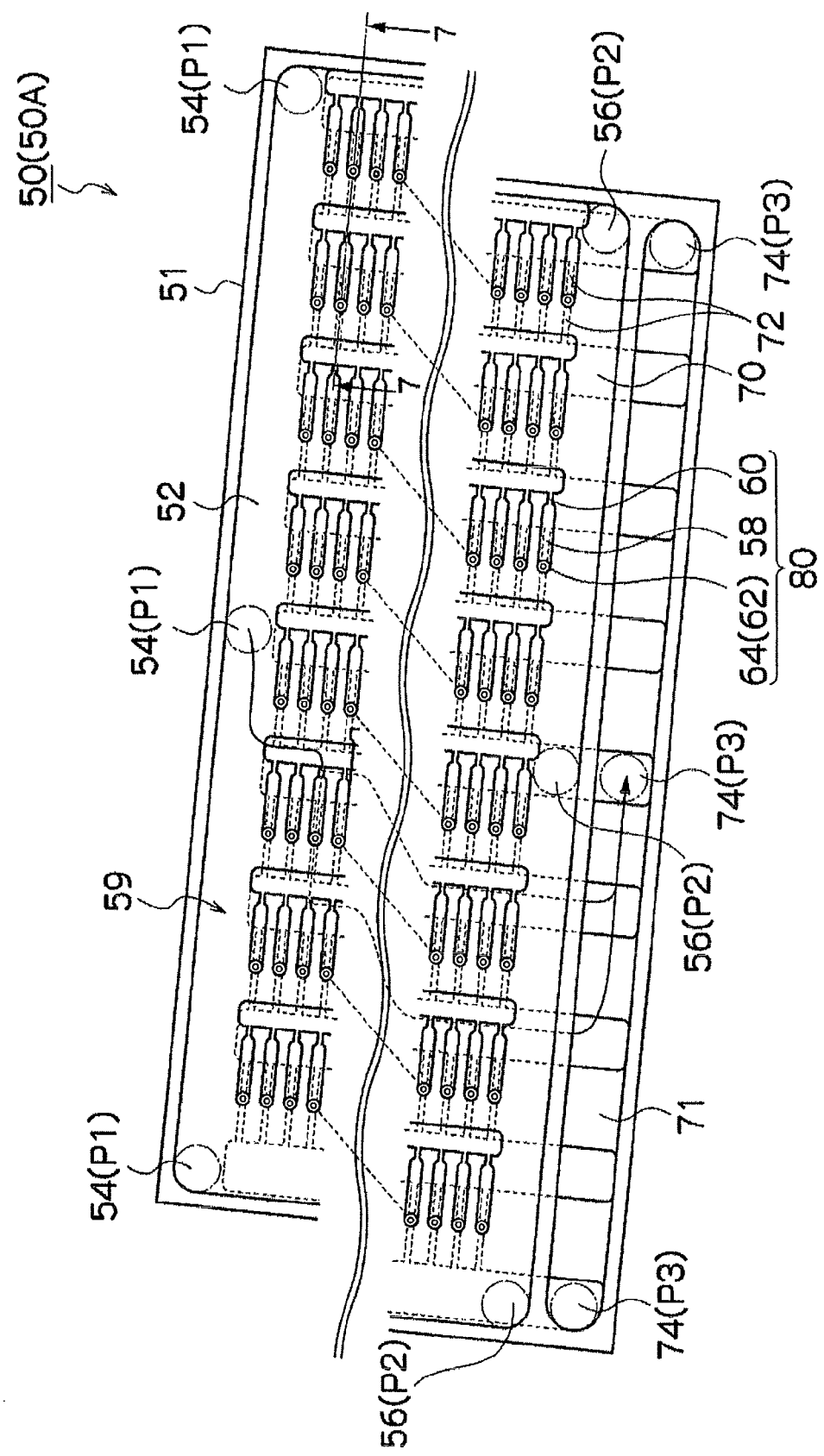
FIG. 3 is a plain view showing a detailed structure of the recording head 50.
Figure 4:
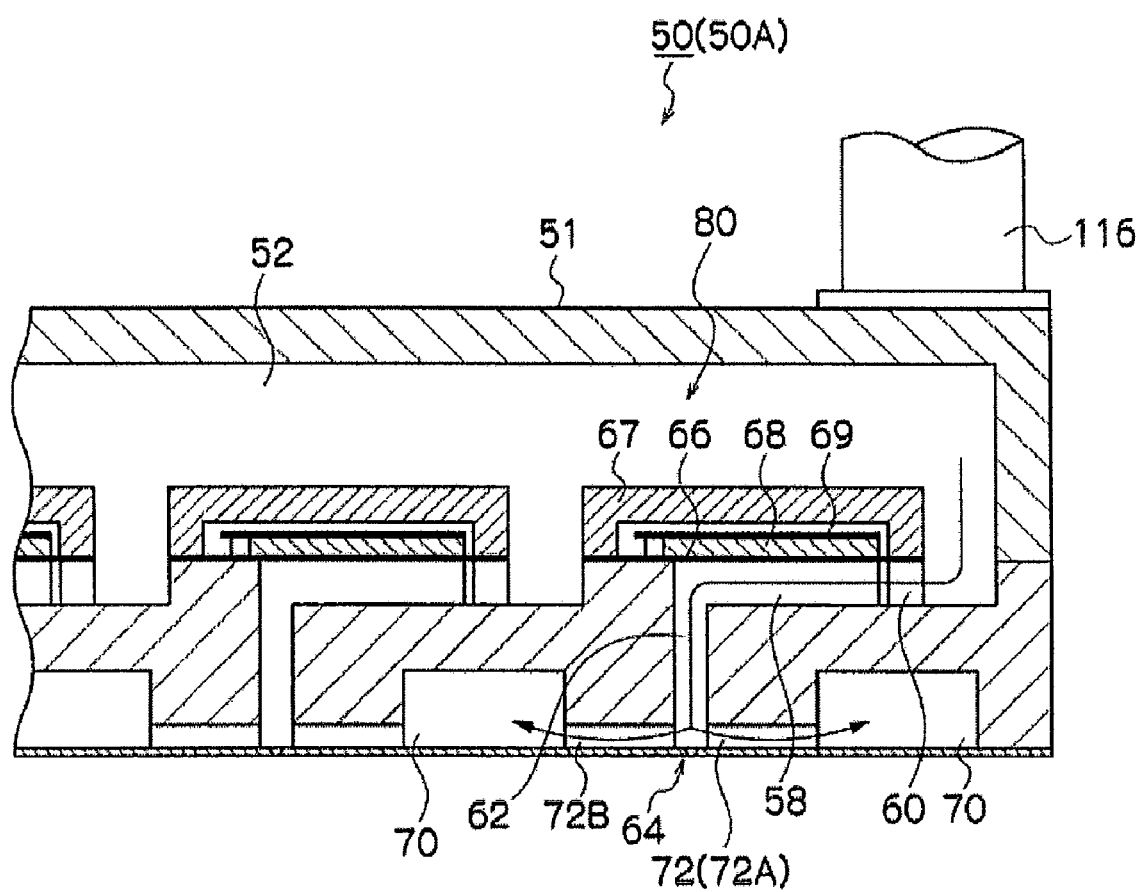
FIG. 4 is a sectional view (sectional view along the line 7-7 in FIG. 3) showing a part of the recording head 50.

FIG. 3 is a plain view showing a detailed structure of the recording head 50. FIG. 4 is a sectional view (sectional view along the line 7-7 in FIG. 3) showing a part of the recording head 50. To facilitate understanding of the configuration of the pressure chamber 58, the vibrating plate 66 and piezoelectric element 68 are not shown in FIG. 3. The recording head 50 in this exemplary embodiment has a plurality of head units 51 shown in FIGS. 3 and 4. Alternatively, the head may have one head unit 51.

As shown in FIG. 3, droplet ejecting devices 80 each including the nozzle 64 and pressure chamber 58 are arranged in a matrix form (2-dimensional form) in the head unit 51. The common flow path 52 is formed across the whole area where each pressure chamber 58 is formed. The common flow path 52 is provided with three first feed openings 54 and three second feed openings 56.

The common circulation path 70 is arranged in each of pressure chamber lines 59 in the head unit 51. With each of the common circulation paths 70 communicates each pressure chamber 58 of the corresponding pressure chamber line 59. Specifically, as shown in FIG. 2, each pressure chamber 58 communicates via the corresponding nozzle flow path 62 and the circulation path 72. A plurality of common circulation paths 70 is connected with one another via a communicating flow path 71, and three recovery openings 74 are formed in the communicating flow path 71.

As shown in FIG. 4, a piezoelectric element 68 provided with an individual electrode 69 is arranged on the vibrating plate 66 which forms the wall surface of the pressure chamber 58. The vibrating plate 66 has an electroconductive substrate having at least an electrode layer (electroconductive layer) formed thereon and serves also as a common electrode for the piezoelectric element 68. Preferable examples of a material for forming the piezoelectric element 68 include a piezoelectric substance made of a material such as lead zirconate titanate (piezo).

A protective cover 67 is provided so as to cover the piezoelectric element 68 on the vibrating plate 66, in view of insulation protection of the piezoelectric element 68 and other wiring members (not shown) from the ink in the common flow path 52.

In the recording head 50 having the above configuration, the pressure of ink in the first feed opening 54 formed upstream of the common flow path 52 is designated P1, the pressure of ink in the second feed opening 56 formed downstream thereof is designated P2, and the pressure of ink in the recovery opening 74 formed at one end of the common circulation path 70 (more specifically, the communicating flow path 71) is designated P3 (see FIG. 3). When the pressures P1, P2 and P3 are set or regulated so as to satisfy the inequality P1>P2>P3, a stream of ink flowing from the upstream side to downstream side of the common flow path 52 is formed, and simultaneously a stream of ink flowing from the common flow path 52 to the common circulation path 70 via the supply path 60, pressure chamber 58, nozzle flow path 62 and circulation path 72 is formed. Generally, the flow path sectional area of the common flow path 52 is large to make fluidic resistance be small, and so the difference ΔP between the pressure at the first feed opening 54 and the pressure at the second feed opening 56 is several hundred Pa to several kPa.

The amount of ink flowing through the common flow path 52 per unit time (flow rate) can be determined from the fluidic resistance of the common flow path 52 and the difference between the pressure of ink at the first feed opening 54 and that at the second feed opening 56 (P1-P2). The flow rate of ink in the common flow path 52 is preferably regulated so as to be capable of regulating the change in temperature by the heat evolution of the recording head 50 as well as be capable of pushing air bubbles away when the air bubbles are introduced into the common path flow 52. Both the conditions can be satisfied when the flow rate is increased. The flow rate should be set in such a range as not to generate a turbulent flow in the common flow path 52. There may not be the case where such a range is not found as long as the general heat generation amount and dimensions of the inkjet head are used.

The amount of flowing ink through the common flow path 52 per unit time may be practically, for example, about 10 to 20 times as high as the amount of ink consumed from the head in a fully ejecting state (that is, in a state of the head ejecting with maximum frequency and in maximum jet volume for image forming) per unit time. When a head which jets 2 pl with 40 kHz has a nozzle density of 1200 dpi and has a length of 2 inches per unit, the amount of ink consumed is 2×2×1200×40000 [pl/sec]=0.192 [ml/sec], and thus the amount of ink flowing through the common flow path 52 per unit time may be set to be about 2 to 4 [ml/sec].

The pressures P1 and P2 applied respectively to the feed openings 54 and 56 by the pumps 120 and 124 are made weakly negative (that is, lower by about 20 to 60 [mm $H_2O$] than atmospheric pressure) so that the meniscus formed in the opening of each nozzle 64 in the recording head 50 is slightly pulled in.

The pressure of the ink in the nozzle portion in the inkjet head is generally made slightly negative pressure relative to atmospheric pressure so as to inhibit leaking of ink from the nozzle which is not performing ejecting. When the negative pressure is too strong, the surface tension of the meniscus is exceeded by the pressure to allow air to be drawn in the nozzle. For example, when an ink having a surface tension of 35 mN/m is used in a nozzle having a diameter of 18 μm, the maximum surface tension is $1.98 \times 10^{-6}$ N, which corresponds to 8 $kN/m^2$ per unit area of the nozzle. This maximum surface tension is equivalent to 81 $gf/cm^2$. Therefore, the meniscus is balanced with the negative pressure when the negative pressure is −810 mm $H_2O$, and is broken when the negative pressure is lower than −810 mm $H_2O$. Practically, however, since an actual head has many nozzles, the meniscus may be broken even at a back pressure lower than this calculated value due to defects in the machining accuracy, surface roughness of the nozzle portion, defects in water repellent treatment of the nozzle portion, and/or vibration. Although stable results are not necessarily obtained in experiments because of the destabilizing factors described above, the meniscus is often broken at a back pressure lower by 100 mm $H_2O$ to 400 mm $H_2O$ than the atmospheric pressure. Therefore, with taking the margin from experiments into consideration, the upper limit of the back pressure may be set lower by 60 mm $H_2O$ than the calculated value. The lower limit, on the other hand, is lower by 20 mm $H_2O$ than the atmospheric pressure so as to inhibit the leakage of ink caused by environmental changes in pressure and temperature and/or vibration in spite of application of back pressure. Any of these value ranges are not those obtained theoretically but are those experimentally determined as providing stable performance.

In FIG. 1, a flow path 130 is connected to the recovery opening 74 in the recording head 50. The flow path 130 is provided with a pump 132 and connected at the other side of the recovery opening 74 to a reservoir tank 134. The ink circulating from the common flow path 52 via the supply path 60, the pressure chamber 58, the nozzle flow path 62, the circulation path 72 and the common circulation path 70, is passed by the pump 132 through the recovery opening 74 and the flow path 130 and recovered in the reservoir tank 134.

The flow path 136 connecting the reservoir tank 134 with the sub-tank 102 is provided with a solvent concentration detector 104, a solvent addition unit 106, a degasifier 108, a pump 138 and a filter 140 in this order from the upstream side (the side of the reservoir tank 134) to the downstream side (the side of the sub-tank 102).

When the ink recovered in the reservoir tank 134 is returned through the flow path 136 to the sub-tank 102, the concentration of the solvent is detected from ink density, viscosity, flow-rate change, electric conductivity, and/or the like by the solvent concentration detector 104. Subsequently, depending on the detection result by the solvent concentration detector 104, the solvent in the solvent tank 144 is added by the solvent addition unit 106 to the ink in the flow path 136 so that the viscosity of the circulating ink passed through the pressure chamber 58 and the nozzle flow path 62, particularly the viscosity of the ink thickening in the vicinity of nozzles, can be restored to be suitable. The data of the solvent concentration detected with the solvent concentration detector 104 is sent to a solvent concentration control unit (not shown), and the solvent addition unit 106 is driven by the solvent concentration control unit.

Further, degassing treatment, which is a treatment for reducing the amount of dissolved air in the ink, is carried out with the degasifier 108 to which a vacuum pump 146 is connected. When a vacuum degasifier is provided upstream (at the side of the recording head 50) of the pump 124 in the second flow path 118 connecting the sub-tank 102 with the recording head 50, the degasifier 108 is omitted.

The ink degasified with the degasifier 108 is returned to the sub-tank 102 via the filter 140 by the pump 138. Thereafter, the ink, together with the ink supplied from the ink tank 100, is supplied again to the recording head 50.

According to the configuration of the ink circulating system shown in FIG. 1, the reservoir tank 134 is provided between the pump 132 and the solvent addition unit 106 or the degasifier 108. Therefore, the pressure P3 applied by the pump 132 to the recovery opening 74 may be avoided from being influenced by the regeneration treatments such as solvent addition or degassing.

Operation of Ink Circulating System

The operation of the ink circulating system of the inkjet recording apparatus in one embodiment of the image recording apparatus of the invention will be described with reference to FIG. 5.

Figure 5:
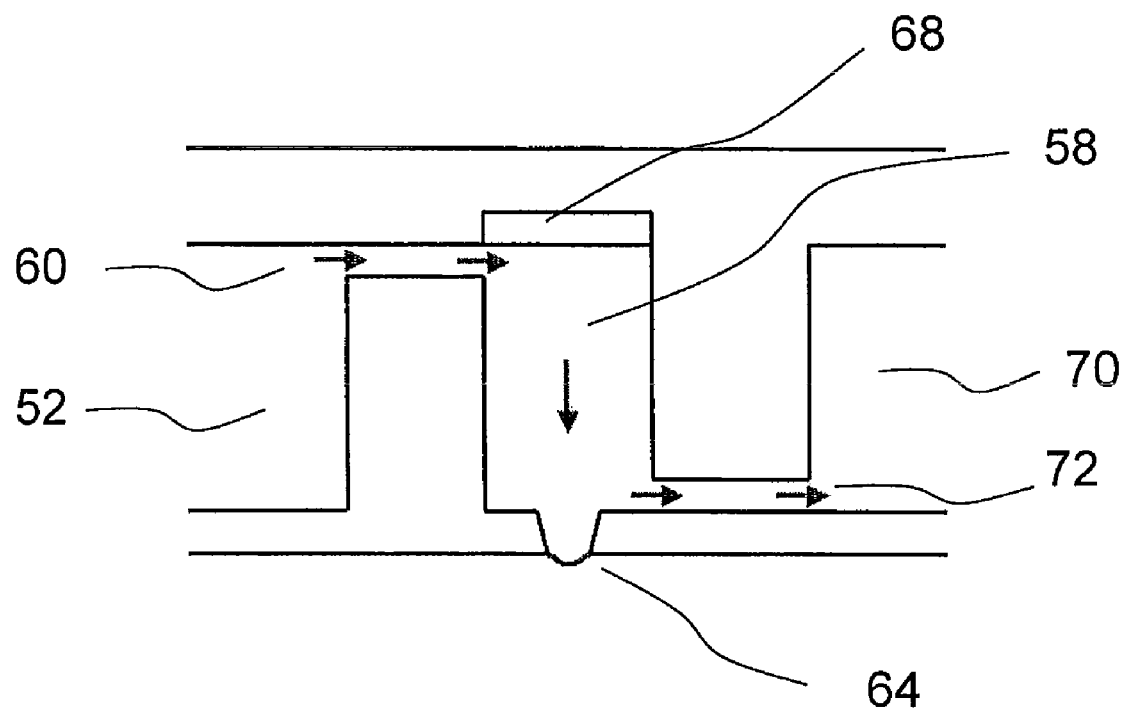
FIG. 5 is an illustration of an ink flow showing a flow of ink flowing from a common flow path 52 via a supply path 60 to a common circulation path 70.

FIG. 5 is an illustration of an ink flow showing a flow of ink flowing from a common flow path 52 to a common circulation path 70 via a supply path 60.

In FIG. 5, an ink supplied from an ink tank (not shown) flows first to the common flow path (feed portion) 52. Then, the ink is supplied from the common flow path (feed portion) 52 to individual pressure chambers 58 via a supply path 60. The supply path 60 is designed such that inertance is increased, and suppressing flowing of the ink backward to the common flow path (feed portion) 52 at the time of ejecting. The ink introduced into the pressure chamber 58 is jetted from the nozzle by driving of a piezoelectric element (actuator) 68. Separately from the working of the piezoelectric element (actuator) 68, the difference between the pressure in the common flow path (feed portion) 52 and that in the common circulation path (circulation portion) 70 causes the ink to flow from the pressure chamber 58 to the common circulation path (circulation portion) 70 via the circulation path 72. This circulation path is designed such that inertance is increased to suppress flowing of the ink to the common circulation path (circulation portion) 70 at the time of ejecting. The ink that flowed to the common circulation path (circulation portion) 70 is returned to the ink tank.

The flows of the ink are summarized in the following Table 1.

The flow in circulation is caused by the difference between the pressure of the liquid in the common flow path (feed portion) and that in the common circulation path (circulation portion). An amount of the ink composition supplied to the droplet ejecting devices may be regulated by changing the difference between a pressure of a liquid in the common flow path and a pressure of a liquid in the common circulation path. The flow in ejecting is caused by the pressure generated by the piezoelectric element (actuator). This rapid flow hardly occurs in the supply path and circulation path which have great inertance.

TABLE 1

Flow for Circulation:

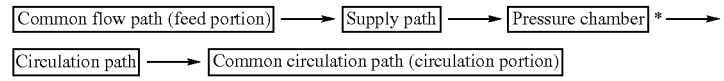

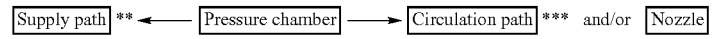

Flow for Ejecting:

[Supply path]  ← [Pressure chamber] → [Circulation path] * and/or [Nozzle]

\* Transfer of the ink from the pressure chamber to the nozzle is NOT involved in this flow.
\*\* Transfer of the ink from the supply path to the common flow path (feed portion) is NOT involved in this flow.
\*\*\* Transfer of the ink from the circulation path to the common flow path (circulation portion) is NOT involved in this flow.

By circulating the ink always as described above, changes in physical properties of the ink due to drying may be suppressed, and the image formation method of the invention having the ink circulating system may have excellent intermittent ink ejecting property.

EXAMPLES

Hereinafter, the invention will be described in more detail with reference to examples, but the invention is not limited to the examples. Further, "parts" and "%" are expressed in terms of weight, unless otherwise specified.

Example 1

Preparation of Ink Composition

Preparation of Pigment (Colorant) Dispersion Liquid

Preparation of Polymer Dispersant PD-1

A mixed solution of 6 parts of styrene, 11 parts of stearyl methacrylate, 4 parts of styrene macromer AS-6 (trade name, manufactured by Toagosei Co., Ltd.), 5 parts of BLEMMER PP-500 (trade name, manufactured by NOF Corporation), 5 parts of methacrylic acid, 0.05 parts of 2-mercaptoethanol and 24 parts of methylethylketone was prepared in a reaction vessel.

Further, a mixed solution was prepared by adding 14 parts of styrene, 24 parts of stearyl methacrylate, 9 parts of styrene macromer AS-6 (trade name, manufactured by Toagosei Co., Ltd.), 9 parts of BLEMMER PP-500 (trade name, manufactured by NOF Corporation), 10 parts of methacrylic acid, 0.13 parts of 2-mercaptoethanol, 56 parts of methylethylketone and 1.2 parts of 2,2'-azobis(2,4-dimethylvaleronitrile) to a dropping funnel.

Then, in a nitrogen atmosphere, the temperature of the mixed solution in the reaction vessel was raised to 75° C. while stirring and the mixed solution in the dropping funnel was gradually dripped into the reaction vessel over the course of one hour. After two hours had elapsed since completion of the dripping, a solution prepared by dissolving 1.2 parts of 2,2'-azobis(2,4-dimethylvaleronitrile) in 12 parts of methylethylketone was dripped therein into the reaction vessel over the course of three hours and the resultant was matured at 75° C. for two hours and at 80° C. for two hours, thereby providing a polymer dispersant (PD-1) solution.

A solid content of a portion of the obtained polymer dispersant solution was isolated by removing the solvent. The obtained solid content was diluted to 0.1% in tetrahydrofuran and the weight-average molecular weight thereof was measured with a high-speed GPC (gel permeation chromatography) device HLC-8220GPC (trade name, manufactured by TOSOH Corporation) by connecting a TSKGEL SUPER HZM-H, a TSKGEL SUPER HZ4000 and a TSKGEL SUPER HZ2000 (all trade names, manufactured by TOSOH Corporation) in series. The measurement result was that the polystyrene-equivalent weight-average molecular weight of the isolated solid content was 25,000. The calculated value of the acid value was 100 mgKOH/g.

Preparation of Cyan Dispersion Liquid

Next, 5.0 g of the obtained polymer dispersant solution by solid content equivalent, 10.0 g of the cyan pigment Pigment Blue 15:3 (produced by Dainichiseika Color & Chemicals Mfg. Co., Ltd.), 40.0 g of methylethylketone, 8.0 g of 1 mol/L sodium hydroxide, 82.0 g of ion-exchange water and 300 g of 0.1 mm zirconia beads were loaded into a vessel and dispersed for 6 hours at 1000 rpm in READY MILL (trade name, manufactured by Aimex Corporation). The obtained pigment dispersion liquid was concentrated at reduced pressure in an evaporator until methylethylketone had been sufficiently removed, and condensed to a pigment concentration of approximately 12%.

Then, the pigment dispersion liquid was subjected to centrifuge treatment for 30 minutes at 8000 rpm and any residual large particles deposited were removed. The absorbance of the supernatant was measured and the concentration of the pigment determined.

In this way, cyan dispersion liquid C1 was prepared as a colorant. The average particle diameter of cyan dispersion liquid C1 was 81 nm.

BLEMMER PP-500 (n is approximately 9)

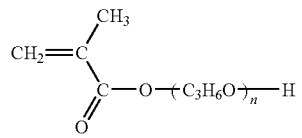

Synthesis and Preparation of Self-Dispersible Polymer Particles

Synthesis Example 1

360.0 g of methyl ethyl ketone was placed in a 2 L three necked flask equipped with a stirrer, a thermometer, a reflux condenser tube, and a nitrogen gas introducing pipe, and the temperature was raised to 75° C. Thereafter, while maintaining the temperature inside the flask at 75° C., a mixed solution containing 180.0 g of phenoxyethyl acrylate, 162.0 g of methyl methacrylate, 18.0 g of acrylic acid, 72 g of methyl ethyl ketone, and 1.44 g of V-601 (trade name, manufactured by Wako Pure Chemical Ind. Ltd.) was added dropwise at a constant rate so that the dropwise addition was completed in 2 hours. After completion of the dropping, a solution containing 0.72 g of V-601 (described above) and 36.0 g of methyl ethyl ketone was added, and stirred at 75° C. for 2 hours. Further, a solution containing 0.72 g of V-601 (described above) and 36.0 g of isopropanol was added, and stirred at 75° C. for 2 hours. Thereafter, the temperature was raised to 85° C., and the stirring was continued for further 2 hours, thereby obtaining a resin solution of a phenoxy ethyl acrylate/methyl methacrylate/acrylic acid (=50/45/5 [weight ratio]) copolymer.

The weight average molecular weight (Mw) of the obtained copolymer was 64,000 (calculated by gel permeation chromatography (GPC) in terms of polystyrene) and the acid value was 38.9 (mgKOH/g).

Next, 668.3 g of the obtained copolymer solution was weighed, and 388.3 g of isopropanol and 145.7 ml of aqueous 1 mol/L NaOH solution were added. Then, the temperature inside the reactor was raised to 80° C. Next, 720.1 g of distilled water was added dropwise at a rate of 20 ml/min so that the copolymer resin is dispersed in water. Thereafter, the resultant was held under an atmospheric pressure at a temperature inside the reactor of 80° C. for 2 hours, and then maintained at 85° C. for 2 hours, and then further maintained at 90° C. for 2 hours. Then, the pressure inside the reactor was reduced, and the isopropanol, methyl ethyl ketone, and distilled water were distilled off in the total amount of 913.7 g, to provide a water dispersion (emulsion) of the self-dispersible polymer particles B-01 having a solid content of 28.0%.

The numerical values attached to parentheses in structural units in the following structural formulae of copolymers are contents of the structural units in each copolymer in terms of weight.

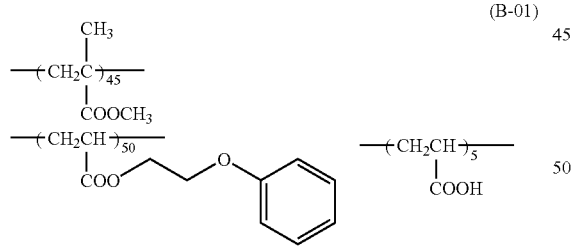

(B-01)

Synthesis Example 2

Self-dispersible polymer particles B-02 to B-05 and BH-1, each having the structure shown below, were respectively prepared in the similar manner as the self-dispersible polymer particles B-01 in Synthesis example 1, except that the kinds and amounts of monomers were changed from the 180.0 g of phenoxyethyl acrylate, 162.0 g of methyl methacrylate and 18.0 g of acrylic acid, 72 g of methyl ethyl ketone to provide the structure shown below.

Properties of the self-dispersible polymer particles B-02 to B-05 and BH-1 are shown in the following Table 2.

Dispersions of the self-dispersible polymer particles B-02 to B-05 and BH-1 were respectively prepared in the similar manner as the dispersion of the self-dispersible polymer particles B-01 in Synthesis example 1, except that the amount of the aqueous 1 mol/L NaOH solution was changed so that the neutralization degree of each self-dispersible polymer in each dispersion became 0.75 mol equivalent with respect to 1 mol of dissociative groups in the polymer.

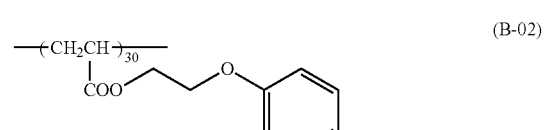

(B-02)

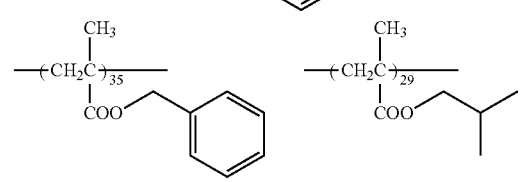

(B-03)

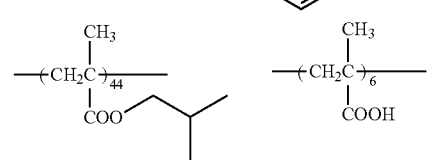

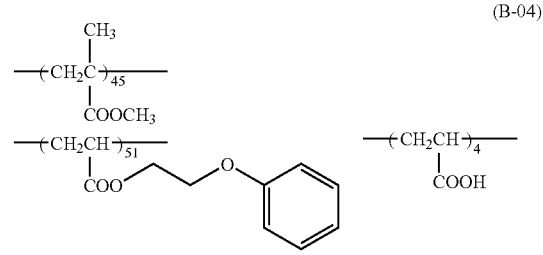

(B-04)

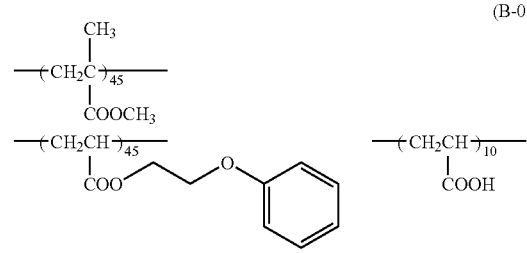

(B-05)

In addition, polymer particles BH-10 and BH-11, each having the structure shown below with acrylic acid amount of 3% (acid value: 23) or 15% (acid value: 117), were respectively prepared. These polymer particles BH-10 and BH-11 did not show self-dispersibility.

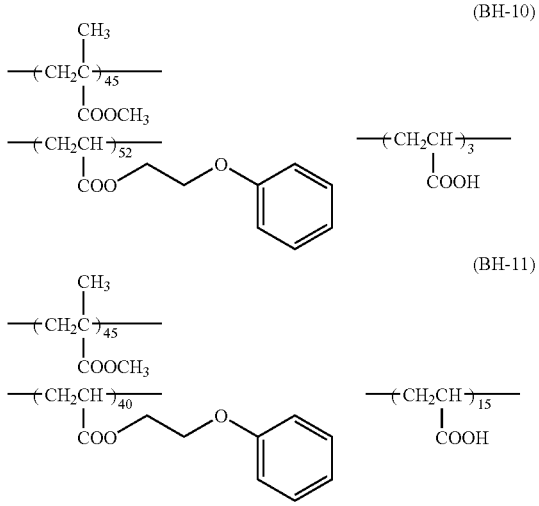

(BH-10)

(BH-11)

Preparation of Polymer Particles by Emulsion Polymerization 8.1 g of PIONIN A-43s (manufactured by Takemoto Oil & Fat Co., Ltd.; emulsifier) and 236.0 g of distilled water were put into a 1-liter three-necked flask provided with a stirring device and a reflux cooling pipe, and heated to 70° C. while stirring under a nitrogen gas flow. 6.2 g of styrene, 3.5 g of n-butyl acrylate, 0.3 g of acrylic acid, 1.0 g of ammonium persulphate and 40 g of distilled water were added and stirred for 30 minutes, whereafter a monomer solution formed from 117.8 g of styrene, 66.5 g of n-butyl acrylate and 5.7 g of acrylic acid was dripped in at a constant speed such that the dripping was completed in 2 hours. After completion of the dripping, an aqueous solution formed from 0.5 g of ammonium persulphate and 20 g of distilled water was added and stirred at 70° C. for 4 hours, after which the temperature of the resultant was raised to 85° C. and stirring continued for a further 2 hours. The reaction solution was cooled and filtered, thereby providing a dispersion solution of polymer particles represented by the following chemical compound (BH-1). The properties of the polymer particles are shown in Table 2.

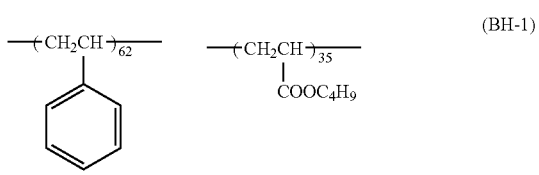

(BH-1)

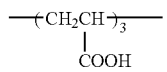

TABLE 2

| | Weight-average molecular weight | Acid value (mgKOH/g) | Particle diameter (nm) |
|---|---|---|---|
| B-01 | 64,000 | 39 | 30 |
| B-02 | 58,000 | 39 | 32 |
| B-03 | 65,000 | 39 | 40 |
| B-04 | 65,000 | 31 | 30 |
| B-05 | 69,000 | 78 | 10 |
| BH-1 | 232 | 23 | 70 |

Preparation of Ink Composition

The colorant dispersion (cyan dispersion C1) obtained above was mixed with other components to prepare an ink composition having the following formulation. The thus-prepared liquid ink composition was packed in a plastic disposable syringe and then filtered through a PVDF filter having a mesh size of 5 μm (trade name: MILLEX-SV, manufactured by Millipore, diameter: 25 mm) to produce Ink-1.

| Formulation of Ink-1: | |
|---|---|
| Cyan pigment (Pigment Blue 15:3): | 3% |
| Polymer dispersant PD-1: | 1.5% |
| Self-dispersible polymer particles B-01: | 6% |
| SUNNIX GP-250 (New Pole GP-250) (trade name, manufactured by Sanyo Chemical Industries, Ltd.; the second water-soluble organic solvent): | 10% |
| Diethylene glycol monoethyl ether (manufactured by Wako Pure Chemical Industries, Ltd.; the first water-soluble organic solvent): | 6% |
| NEWPOLE PE108 (trade name, manufactured by Sanyo Chemical Industries, Ltd.; nonionic polymer compound): | 0.6% |
| Surfactant (trade name: OLFIN E1010, manufactured by Nisshin Chemicals Co., Ltd.): | 1% |
| Ultrapure water: | 69.5% |

Ink-2 to Ink-16 were prepared in the similar manner as Ink-1, except that the formulation of the inks were changed as shown in the following Table 3.

TABLE 3

| | | Ink-1 | Ink-2 | Ink-3 | Ink-4 | Ink-5 | Ink-6 | Ink-7 |
|---|---|---|---|---|---|---|---|---|
| Cyan pigment | | 3% | 2.5% | 2.5% | 2.5% | 2.5% | 2.2% | 3% |
| Polymer dispersant | | 1.5% | 1.3% | 1.3% | 1.3% | 1.3% | 1.1% | 1.5% |
| First organic solvent | Solvent | GP-250 | GP-250 | GP-250 | GP-250 | GP-250 | GP-250 | GP-400 |
| | SP value | 26.4 | 26.4 | 26.4 | 26.4 | 26.4 | 26.4 | 23.2 |
| | Content | 10% | 10% | 10% | 13% | 16% | 10% | 10% |
| Second organic solvent | Solvent | DEGmEE | DEGmEE | TEGmBE | DPG | DEGmEE | TEGmBE | TEGmBE |
| | SP value | 22.4 | 22.4 | 21.1 | 27.1 | 21.5 | 21.1 | 21.1 |
| | Content | 6% | 6% | 5% | 7% | 6% | 5% | 5% |
| Water-soluble polymer compound | Kind | NEWPOLE PE108 | NEWPOLE PE108 | NEWPOLE PE108 | NEWPOLE PE108 | NEWPOLE PE108 | NEWPOLE PE128 | PVA205 |
| | Mw | 16000 | 16000 | 16000 | 16000 | 16000 | 20000 | About 20000 |
| | Content | 0.6% | 0.5% | 0.7% | 0.3% | 0.2% | 0.4% | 1.4% |

TABLE 3-continued

|  |  | Ink-1 | Ink-2 | Ink-3 | Ink-4 | Ink-5 | Ink-6 | Ink-7 |
|---|---|---|---|---|---|---|---|---|
| Polymer particle dispersion | Kind | B-01 | B-02 | B-03 | B-04 | B-05 | B-04 | B-04 |
|  | Content (a) | 6% | 6% | 6% | 6% | 6% | 4% | 6% |
| $V_{high}/V_{low}$ |  | 0.85 | 0.83 | 0.80 | 0.81 | 0.82 | 0.77 | 0.76 |
| Total content of solvent |  | 16% | 16% | 15% | 20% | 22% | 15% | 15% |
| Content of Water-insoluble component (b) |  | 10.5% | 9.8% | 9.8% | 9.8% | 9.8% | 7.3% | 10.5% |
| a/b (%) |  | 57% | 62% | 62% | 62% | 62% | 55% | 57% |
| Remark |  | The Invention | The Invention | The Invention | The Invention | The Invention | The Invention | The Invention |

TABLE 4

|  |  | Ink-8 | Ink-9 | Ink-10 | Ink-11 | Ink-12 | Ink-13 | Ink-14 |
|---|---|---|---|---|---|---|---|---|
| Cyan pigment |  | 2.5% | 3% | 3% | 3% | 5% | 3% | 3% |
| Polymer dispersant |  | 1.3% | 1.5% | 1.5% | 1.5% | 2.5% | 1.5% | 1.5% |
| First organic solvent | Solvent | GP-250 | GP-250 | GP-250 | GP-400 | Glycerin | GP-250 | GP-250 |
|  | SP value | 26.4 | 26.4 | 26.4 | 23.2 | 41.0 | 26.4 | 26.4 |
|  | Content | 8% | 10% | 10% | 10% | 6% | 10% | 10% |
| Second organic solvent | Solvent | TEGmBE | DEGmBE | DEGmBE | DEG | TEGmBE | DPG | DEGmBE |
|  | SP value | 21.1 | 21.5 | 22.4 | 30.6 | 21.1 | 27.1 | 21.5 |
|  | Content | 2% | 5% | 5% | 5% | 12% | 5% | 6% |
| Water-soluble polymer compound | Kind | PVA120 | PVPK30 | PEG | NEWPOLE PE128 | NEWPOLE PE108 | NEWPOLE PE108 | PEG |
|  | Mw | About 90000 | 40000 | 20000 | 20000 | 16000 | 16000 | 6000 |
|  | Content | 0.1% | 1.1% | 0.5% | 0.2% | 0.5% | 0.5% | 1.8% |
| Polymer particle dispersion | Kind | B-02 | B-04 | B-05 | B-05 | B-03 | BH-1 | B-03 |
|  | Content (a) | 10% | 6% | 6% | 6% | 8% | 6% | 6% |
| $V_{high}/V_{low}$ |  | 0.71 | 0.73 | 0.84 | 0.80 | 0.82 | 0.80 | 0.93 |
| Total content of solvent |  | 10% | 15% | 15% | 15% | 18% | 15% | 16% |
| Content of Water-insoluble component (b) |  | 13.8% | 10.5% | 10.5% | 12.5% | 13.5% | 10.5% | 10.5% |
| a/b (%) |  | 73% | 57% | 57% | 64% | 44% | 57% | 57% |
| Remark |  | The Invention | The Invention | The Invention | The Invention | The Invention | The Invention | The Invention |

TABLE 5

|  |  | Ink-15 | Ink-16 | Ink-17 | Ink-18 | Ink-19 | Ink-20 | Ink-21 |
|---|---|---|---|---|---|---|---|---|
| Cyan pigment |  | 3% | 3% | 3% | 3% | 3% | 3% | 3% |
| Polymer dispersant |  | 1.5% | 1.5% | 1.5% | 1.5% | 1.5% | 1.5% | 1.5% |
| First organic solvent | Solvent | GP-250 | GP-250 | GP-250 | GP-250 | Glycerin | GP-250 | GP-250 |
|  | SP value | 26.4 | 26.4 | 26.4 | 26.4 | 41.0 | 26.4 | 26.4 |
|  | Content | 18% | 10% | 10% | 10% | 20% | 10% | 4% |
| Second organic solvent | Solvent | DEGmEE | DEGmEE | DEGmEE | DEGmEE | DEG | DEGmEE | — |
|  | SP value | 22.4 | 22.4 | 22.4 | 22.4 | 30.6 | 22.4 | — |
|  | Content | 9% | 6% | 6% | 6% | 11% | 6% | — |
| Water-soluble polymer compound | Kind | — | — | Methyl cellulose (SM-15) | NEWPOLE PE68 | NEWPOLE PE108 | Xanthan gum | NEWPOLE PE108 |
|  | Mw | — | — | 149000 | 4200 | 16000 | >1000000 | 16000 |
|  | Content | — | — | 0.2% | 2.0% | 0.1% | 0.01% | 2.0% |
| Polymer particle dispersion | Kind | B-01 | B-01 | B-01 | B-01 | B-05 | B-01 | B-02 |
|  | Content (a) | 6% | 6% | 6% | 6% | 6% | 6% | 6% |
| $V_{high}/V_{low}$ |  | 0.97 | 0.98 | 0.65 | 0.96 | 0.87 | 0.47 | 0.83 |
| Total content of solvent |  | 27% | 16% | 16% | 16% | 31% | 16% | 4% |
| Content of Water-insoluble component (b) |  | 10.5% | 10.5% | 10.5% | 10.5% | 10.5% | 10.5% | 10.5% |
| a/b (%) |  | 57% | 57% | 57% | 57% | 57% | 57% | 57% |
| Remark |  | Comparative | Comparative | Comparative | Comparative | Comparative | Comparative | Comparative |

Preparation of Treatment Liquid

A treatment liquid was prepared by mixing components so as to yield the following formulation.

| Formulation of Treatment liquid | |
|---|---|
| Diethylene glycol monoethyl ether (DEGmEE) (water-soluble organic solvent, SP value: 22.4) | 15% |
| OLFIN E1010 (described above, SP value: none) | 1% |
| Citric acid (SP value: none) | 15% |
| Ultrapure water (SP value: none) | 69% |

Measurement of $V_{high}/V_{low}$ (Viscosity Ratio at High Shear Rate)

$V_{high}$ represents 25° C. viscosity (mPa·s) measured at a shear rate of $1.5 \times 10^5$ (s$^{-1}$), and $V_{low}$ represents 25° C. viscosity (mPa·s) measured at a shear rate of $3.0 \times 10^3$ (s$^{-1}$). \T$_{high}$ and $V_{low}$ were respectively measured using a microchip-type MICRON-SAMPLE VISCOMETER VROC (described above) and a C-Type measurement chip (depth: 100 μm), the measurement units of which were all stored in an incubator and the temperature was adjusted to 25° C., and employed to calculate $V_{high}/V_{low}$.

Evaluation

Inkjet Recording Apparatus:

An inkjet recording apparatus having the configuration as shown in FIG. 1 and set under the following conditions was used in the following evaluation tests, while the solvent concentration detector 104, the solvent addition unit 106 and the filter 140 are not herein employed.

Conditions of Inkjet Recording Apparatus for Evaluation:

Temperature of ink in sub-tank 102: 25° C.

Mesh size of Filter 122: 5 μm

Head unit 51: nozzle size: 18 μm; 120 dpi; the length of 1 unit: 2 cm

Material of Piezoelectric element 68: lead zirconate titanate (piezo)

Flow rate of ink flowing in common flow path 52: 2 to 4 mL/sec

Image Formation

A recording medium shown (trade name: TOKUBISHI ART, manufactured by Mitsubishi Seishi Co., basis weight: 104.7 g/m$^2$) was fixed onto a stage linearly movable at 500 mm/sec in a predetermined direction, and the treatment liquid obtained above was applied via a wire bar coater onto the recording medium in an amount of about 5 g/m$^2$ and immediately thereafter dried at 50° C. for 2 seconds.

Thereafter, the recording medium was mounted (fixed) onto the inkjet recording apparatus, and cyan ink was jetted in a line system under ejecting conditions where the volume of ink droplet was 2.4 pL, the ejecting frequency was 24 kHz, the resolution was 1200 dpi×600 dpi with transferring the recording medium at a constant speed in the vertical scanning direction so as to print a cyan-color image on the recording medium.

Immediately after the image was printed, the recording medium was dried at 50° C. for 3 seconds, then and subjected to fixing treatment by being passed through a nip between a pair of fixing rolls heated at 60° C. with a nip pressure of 0.20 MPa and a nip width of 4 mm.

The fixing rolls has: a heating roll having a silicone resin-coated cylindrical core bar made of stainless steel (SUS) with a halogen lamp provided in the cylindrical core bar; and an opposite roll contacting the heating roll with pressure.

In the following Example 2, a gloss-coat paper (trade name: OK TOP COAT, manufactured by Mitsubishi Seishi Co., basis weight: 104.7 g/m$^2$) was used as the recording medium in place of the TOKUBISHI ART (described above).

In the following Example 3, a matt-coat paper (trade name: NWEW AGE, manufactured by Mitsubishi Seishi Co., basis weight: 104.7 g/m$^2$) was used as the recording medium in place of the TOKUBISHI ART (described above).

In the following Comparative example 17, in which the ink was not circulated, image forming were performed with physically closing the flow path 130 in FIG. 1 so as to prevent flowing of the ink via the circulation path 72 to the common circulation path 70.

Evaluation of Ejection Consistency

The treatment liquid was coated and dried, and drying was performed after an image was printed, using IMAGE COLOR: PHOTOFINISH PRO (trade name, manufactured by FUJIFILM Corporation) as the recording medium, and a 75×24000 dpi line image was drawn at an ejection frequency of 12 kHz without passing the medium through a fixing roller.

The center value of the lines was measured using a DOT ANALYZER DA-6000 (trade name, manufactured by Oji Scientific Instruments), and the standard deviation a of the misalignment of each line was calculated and evaluated according to the following criteria.

AA: σ is less than 2 μm

A: σ is less than 4 μm but 2 μm or more

B: σ is less than 6 μm but 4 μm or more

C: σ is 6 μm or more

D: Stable printing could not be performed and measurement was impossible

Evaluation of Image Resolution

Using the above ink composition and the above inkjet recording device, fine line images were formed parallel to the direction of movement in the stages of the above image recording method. The lines had a width of 2 dots, with an interval having a width equivalent to 2 dots between adjacent lines, and the lines were observed using an optical microscope and evaluated according to the following criteria.

Evaluation Criteria

A: Favorable, with no variation in line width or linkage between adjacent lines.

B: Ink droplets coalesce on the recording medium causing variation in line width, but there is no linkage between adjacent lines.

C: There is linkage between adjacent lines.

Evaluation of Suitability to Intermittent Ejecting

Using the ink composition obtained above, the suitability of the ink to intermittent jetting was evaluated in the following manner. The environment for the evaluation was 25° C. and 50% RH.

The ink composition was continuously jetted by the inkjet recording apparatus described above for 1 minute to form an image by the image formation method, and then ejecting was stopped for 60 minutes. Thereafter, image formation was restarted and carried out again. The image formation carried out again was observed and used as an indicator of intermittent jet. Specifically, whether the following conditions for evaluation were satisfied or not in the restarted image formation was observed and judged according to the following evaluation criteria. Image irregularity was visually observed with an optical microscope. Jet degree is defined as "(number of nozzles which performed ejecting)/(number of all nozzles)×100(%)".

Conditions for Evaluation:

(1) Jet degree is 90% or more.

(2) The nozzles with ejecting the ink in incorrect directions are less than 10% of all the nozzles.

(3) Image irregularity is not observed in the solid image.

Evaluation Criteria:

A: All the three conditions were satisfied.

B: Two among the three conditions were satisfied.

C: Two or more among the three conditions were not satisfied.

Evaluation of Fixability

After the ink composition was used to print a 50% solid image, the printed image was left for 24 hours in a room regulated at 25° C. and 60% RH. The obtained sample was evaluated for its tape-peeling resistance and rubbing resistance as follows.

Evaluation of Resistance of Printed Image Against Peeling with Tape

A mending tape (manufactured by Sumitomo 3M, width: 18 mm) was affixed to the printed image portion. Then, the tape was peeled off at a speed of 1 cm/sec, and adhesion of ink to the tape was evaluated according to the following criteria.

Evaluation Criteria

A: No adhesion of ink to the tape was observed.

B: Slight adhesion of ink to the tape was observed, but not to a degree that would pose problems for practical application.

C: Extensive adhesion of ink to the tape was observed.

Evaluation of Resistance of Printed Image Against Rubbing

A solid image having the coverage of 50% and a size of 2 cm×2 cm was printed on an image recording medium by the image recording method. Immediately after the image printing, a sheet of an image recording medium, which was the same product as the printed recording medium and had no printed image, was placed over an image-bearing surface of the printed image recording medium, and rubbed thereagainst ten times with a load of 150 g/cm². The degree of vulnerability of the printed image and transferability of the ink from the printed image to non-printed portions of the non-printed recording medium was observed by naked eyes and evaluated according to the following criteria.

Criteria of Evaluation:

A: No transfer of the ink is observed.

B: Practically no ink transfer is observed, although the surface of the rubbed image is slightly scratched.

C: A scratch on the surface of the rubbed image is remarkable, and/or ink transfer to non-printed portions of the non-printed recording medium is remarkable.

As is understood from Table 6, the Examples using the ink composition of the invention and the Examples using the image forming apparatus of the invention which is provided with the ink composition of the invention and the ink circulation apparatus had excellent intermittent ejecting property and provided images with excellent resolution. On the other hand, comparative examples were inferior to the Examples of the invention in at least one evaluation item.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition comprising:
   a water-soluble organic solvent;
   a pigment;
   water;
   self-dispersible polymer particles; and
   a nonionic polymer compound as a thickener, the content of the water-soluble organic solvent being from 5 weight % to 30 weight % relative to the total amount of the ink composition, and the ratio of $V_{high}/V_{low}$, in which $V_{high}$ represents 25° C. viscosity (mPa·s) measured at a shear rate of $1.5 \times 10^5$ ($s^{-1}$) and $V_{low}$ represents 25° C. viscosity (mPa·s) measured at a shear rate of $3.0 \times 10^3$ ($s^{-1}$), being from 0.70 to 0.95, wherein the nonionic polymer compound comprises at least one selected from the group consisting of polyoxyethylene glycol and polyoxyethylene-polyoxypropylene block copolymer; and 70 weight % or more of the water-soluble organic solvent is a water-soluble organic solvent having a solubility parameter value of 27.5 or less.

2. The ink composition of claim 1, wherein the nonionic polymer compound has a weight-average molecular weight of from 5,000 to 100,000.

3. The ink composition of claim 1, wherein the pigment is dispersed with a water-insoluble dispersant.

4. The ink composition of claim 1, wherein the pigment is dispersed by a phase inversion method.

TABLE 6

| | Ink | Recording medium | Ink Circulation | Ejection consistency | Image resolution | Peeling resistance | Rubbing resistance | Intermittent ejecting |
|---|---|---|---|---|---|---|---|---|
| Example 1 | Ink 1 | TOKUBISHI ART | Performed | AA | A | A | A | A |
| Example 2 | Ink 1 | OK TOP COAT | Performed | AA | A | A | A | A |
| Example 3 | Ink 1 | NEW AGE | Performed | AA | A | A | A | A |
| Example 4 | Ink 2 | TOKUBISHI ART | Performed | AA | A | A | A | A |
| Example 5 | Ink 3 | TOKUBISHI ART | Performed | AA | A | A | A | A |
| Example 6 | Ink 4 | TOKUBISHI ART | Performed | AA | A | A | B | A |
| Example 7 | Ink 5 | TOKUBISHI ART | Performed | AA | A | A | B | A |
| Example 8 | Ink 6 | TOKUBISHI ART | Performed | AA | A | A | A | A |
| Example 9 | Ink 7 | TOKUBISHI ART | Performed | AA | A | A | A | A |
| Example 10 | Ink 8 | TOKUBISHI ART | Performed | AA | A | A | A | A |
| Example 11 | Ink 9 | TOKUBISHI ART | Performed | AA | A | A | A | A |
| Example 12 | Ink 10 | TOKUBISHI ART | Performed | AA | A | A | A | A |
| Example 13 | Ink 11 | TOKUBISHI ART | Performed | AA | A | A | A | A |
| Example 14 | Ink 12 | TOKUBISHI ART | Performed | AA | A | A | A | A |
| Example 15 | Ink 13 | TOKUBISHI ART | Performed | AA | A | A | A | A |
| Example 16 | Ink 14 | TOKUBISHI ART | Performed | AA | A | A | A | A |
| Example 17 | Ink 1 | TOKUBISHI ART | Omitted | AA | A | A | A | B |
| Comparative example 1 | Ink 15 | TOKUBISHI ART | Performed | A | B | C | C | A |
| Comparative example 2 | Ink 16 | TOKUBISHI ART | Performed | C | A | A | A | A |
| Comparative example 3 | Ink 17 | TOKUBISHI ART | Omitted | C | A | A | A | C |
| Comparative example 4 | Ink 18 | TOKUBISHI ART | Performed | A | C | B | B | A |
| Comparative example 5 | Ink 19 | TOKUBISHI ART | Performed | A | B | C | C | A |
| Comparative example 6 | Ink 20 | TOKUBISHI ART | Performed | D | A | A | A | C |
| Comparative example 7 | Ink 21 | TOKUBISHI ART | Performed | D | A | A | A | C |

5. The ink composition of claim 1, wherein the total amount of the pigment, an optional water-insoluble dispersant and optional polymer particles is at least 7 weight % relative to the total mass of the ink composition.

6. An image formation method comprising ejecting the ink composition of claim 1 onto an image recording medium using an image formation apparatus to form an image on the image recording medium, the image formation apparatus comprising a plurality of droplet ejecting devices and an ink circulation unit, the ink circulation unit comprising a common flow path communicating with the plurality of droplet ejecting devices via supply paths, and a common circulation path communicating with the plurality of droplet ejecting devices via circulation paths, and the ink circulation unit supplying the ink composition to the plurality of droplet ejecting devices from the common flow path and circulating the ink composition through the common circulation path.

7. The image formation method of claim 6, wherein each of the plurality of droplet ejecting devices has a nozzle that ejects the ink composition, the ink composition is supplied from the common flow path to the plurality of droplet ejecting devices via the supply paths, and a residual portion of the ink composition that is supplied to the plurality of droplet ejecting devices but is not jetted from the nozzles is transferred to the common circulation path via the circulation paths so as to circulate the ink composition.

8. The image formation method of claim 6, further comprising changing the difference between the pressure of the ink composition in the common flow path and the pressure of the ink composition in the common circulation path so as to regulate the amount of the ink composition supplied to the plurality of droplet ejecting devices.

9. The image formation method of claim 6, wherein:

each of the plurality of droplet ejecting devices comprises a nozzle that ejects the ink composition, a pressure chamber communicating with the common flow path, and a nozzle flow path communicating with the nozzle and the pressure chamber;

the ink composition is supplied from the common flow path to the plurality of droplet ejecting devices via the supply paths; and the circulation path communicates with the nozzle flow paths.

* * * * *